US008605903B2

(12) United States Patent
Morita et al.

(10) Patent No.: US 8,605,903 B2
(45) Date of Patent: Dec. 10, 2013

(54) SYSTEM, DEVICE, AND METHOD FOR WIRELESS COMMUNICATION, APPARATUS AND METHOD FOR PROCESSING INFORMATION FROM CONTACTLESS IC CARDS

(75) Inventors: Tadashi Morita, Tokyo (JP); Toshinori Kanemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1189 days.

(21) Appl. No.: 11/797,808

(22) Filed: May 8, 2007

(65) Prior Publication Data

US 2008/0137862 A1 Jun. 12, 2008

(30) Foreign Application Priority Data

May 12, 2006 (JP) .................................. 2006-133774
Jul. 28, 2006 (JP) .................................. 2006-205702

(51) Int. Cl.
*H04K 1/00* (2006.01)
(52) U.S. Cl.
USPC ............... 380/270; 713/171; 713/184; 726/9; 726/20
(58) Field of Classification Search
USPC .......................................................... 380/270
See application file for complete search history.

(56) References Cited

U.S. PATENT DOCUMENTS

| 2003/0212894 A1* | 11/2003 | Buck et al. .................... 713/184 |
| 2004/0181540 A1 | 9/2004 | Jung et al. |
| 2005/0273609 A1* | 12/2005 | Eronen .......................... 713/171 |

FOREIGN PATENT DOCUMENTS

| EP | 1 499 070 A2 | 1/2005 |
| JP | 01-212039 A | 8/1989 |
| JP | 02-031290 A | 2/1990 |
| JP | 02-044389 A | 2/1990 |
| JP | 2002-232414 A | 8/2002 |
| JP | 2003-143128 A | 5/2003 |
| JP | 2004-127052 A | 4/2004 |
| JP | 2004-215225 A | 7/2004 |
| JP | 2004-282295 A | 10/2004 |
| JP | 2005-065247 | 3/2005 |
| JP | 2005-348306 | 12/2005 |

OTHER PUBLICATIONS

Standard ECMA-340 2nd Edition, Near Field Communication Interface and Protocol (NFCIP-1), Dec. 2004.*
Australian Patent Office Search Report; Application No. SG 200703233-7; Dated May 4, 2007.
Japanese Office Action issued Oct. 25, 2012 for corresponding Japanese Application No. 2006-205702.
English language translation of Japanese Office Action issued Sep. 18, 2012 for corresponding Japanese Application No. 2006-205702.

(Continued)

*Primary Examiner* — Kambiz Zand
*Assistant Examiner* — Jason Plotkin
(74) *Attorney, Agent, or Firm* — Rader, Fishman & Grauer PLLC

(57) ABSTRACT

A communication system uniquely identifying a communication partner within a predetermined coverage area and transmitting and receiving information in a predetermined protocol, includes a device and an information processing apparatus with one performing wireless communication with the other within the predetermined coverage area. The device includes a random number generating unit, a device secret key storage unit, a communication ID transmitting unit, and a device transmitting and receiving unit. The information processing apparatus includes an apparatus encryption unit, an apparatus secret key storage unit, a communication ID storage unit, a random number acquisition unit and an apparatus transmitting and receiving unit.

21 Claims, 14 Drawing Sheets

(56) References Cited

OTHER PUBLICATIONS

Japanese Office Action issued May 8, 2012 for corresponding Japanese Application No. 2006-205702.

Nagai, Masatake, "Actual and Future Situations of Short Distance Communication Network Technique" Interface, Japan, (Online), Apr. 2005, the April number, pp. 44-56, (Apr. 26, 2012, Retrieval), Internet, URL. <http://www.cqpub,c.jp/interface/sample/200504/if0504_chap1.pdf>.

* cited by examiner

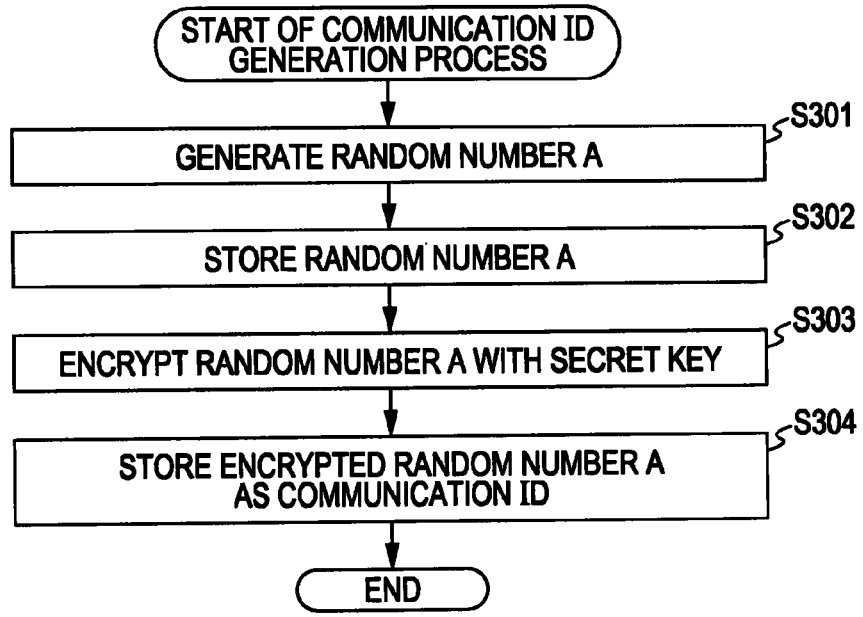
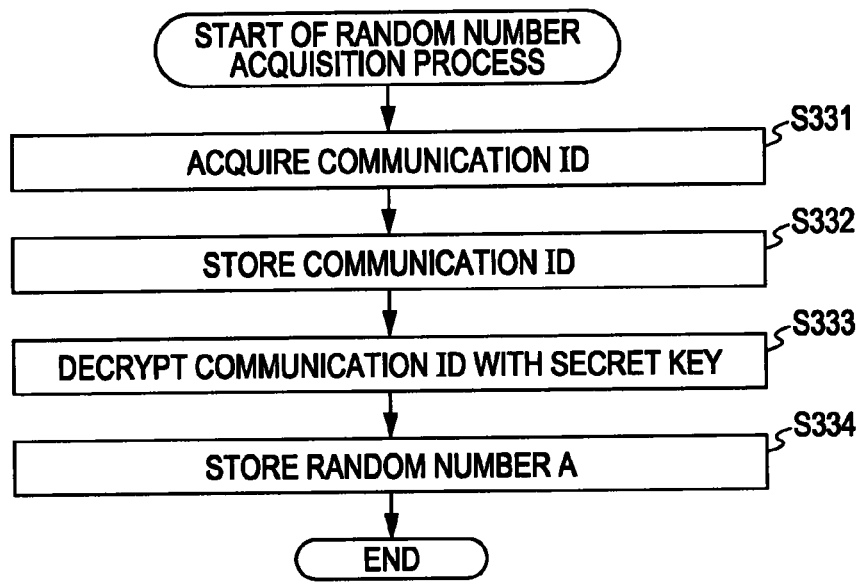

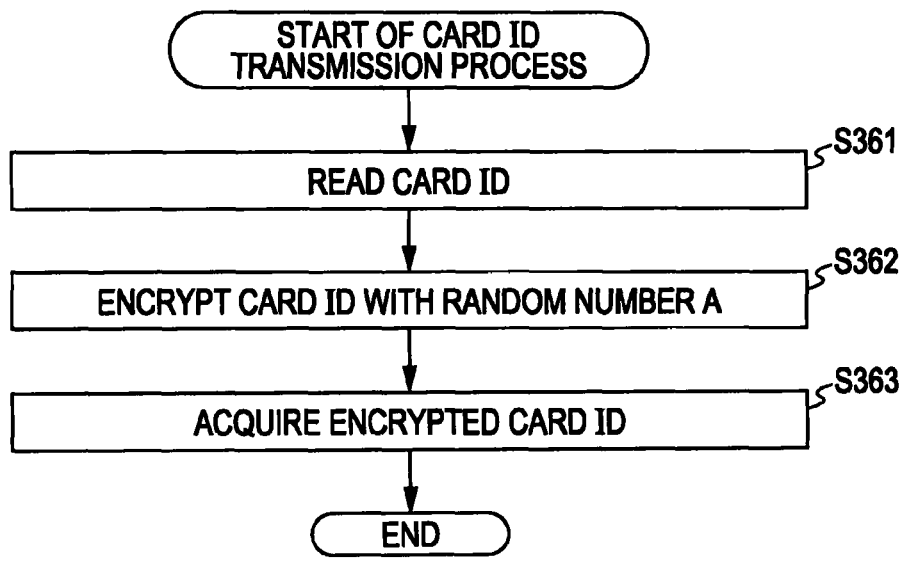
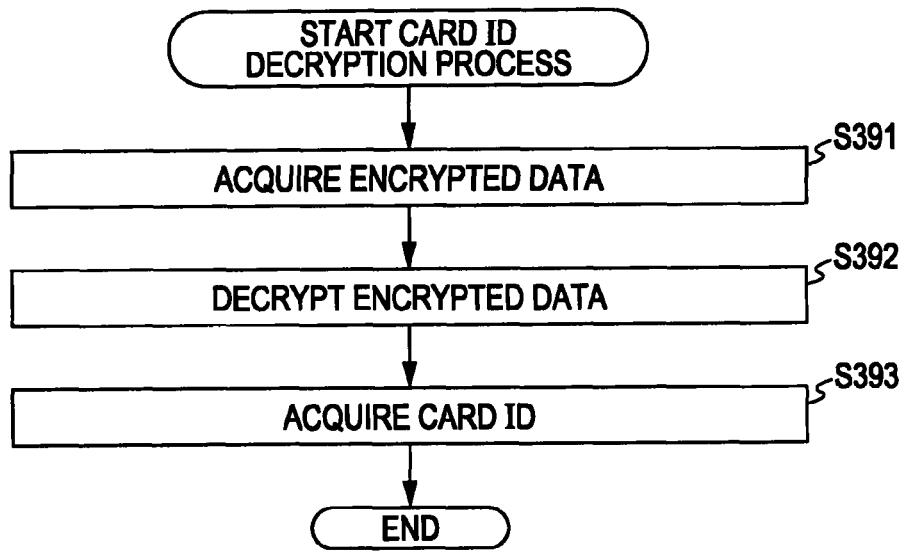

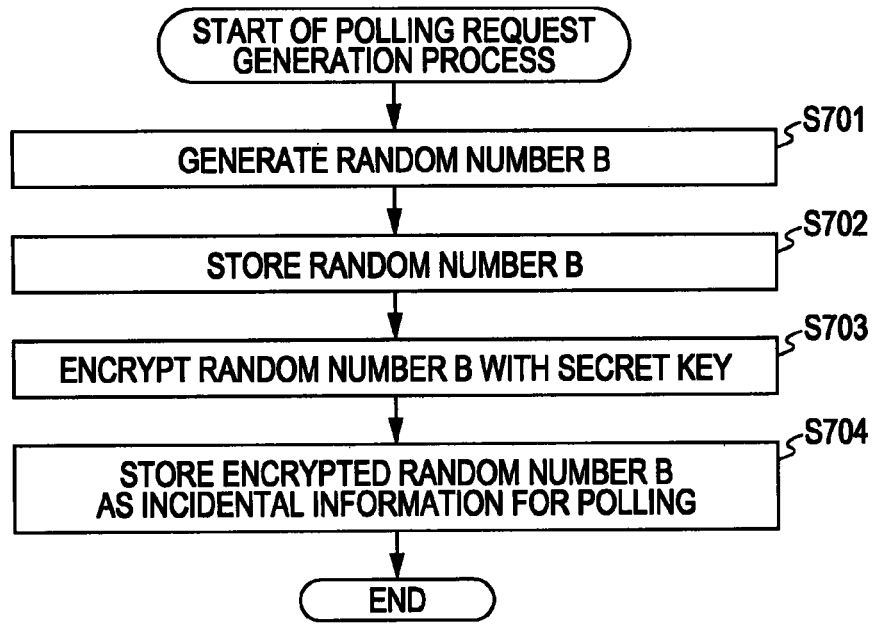
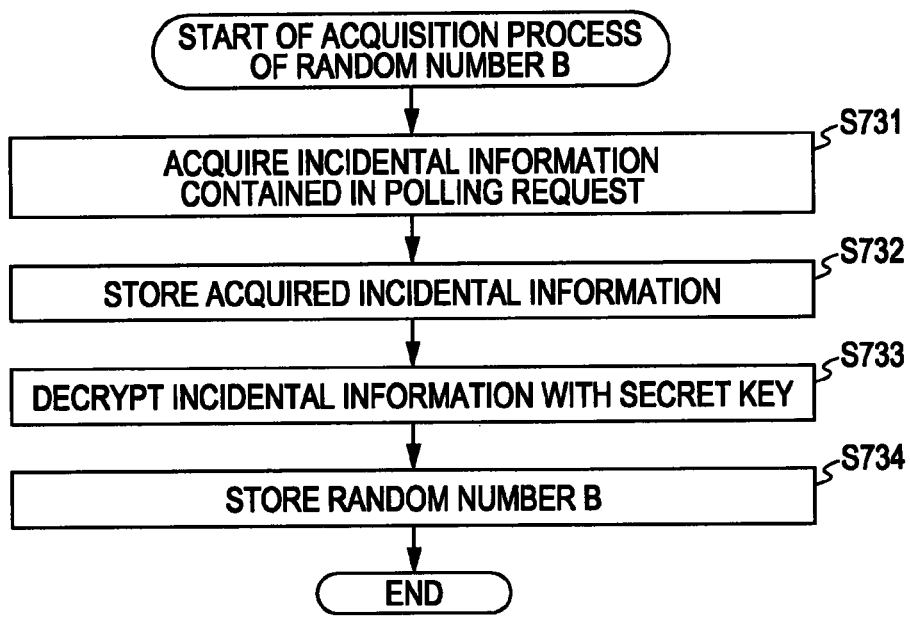

SYSTEM, DEVICE, AND METHOD FOR WIRELESS COMMUNICATION, APPARATUS AND METHOD FOR PROCESSING INFORMATION FROM CONTACTLESS IC CARDS

CROSS REFERENCES TO RELATED APPLICATIONS

The present invention contains subject matter related to Japanese Patent Application JP 2006-205702 filed in the Japanese Patent Office on Jul. 28, 2006, the entire contents of which are incorporated herein by reference.

BACKGROUND OF THE INVENTION

1. Field of the Invention

The present invention relates to a system, device, and method for communication, an apparatus and method for processing information, a computer program and a recording medium. More particularly, the present invention relates to a system, device, and method for communication, an apparatus and method for processing information, a computer program and a recording medium for performing safe and highly convenient communications with a simple arrangement.

2. Description of the Related Art

Contactless IC cards and radio frequency identification (RFID) are now in widespread use. If a plurality of contactless IC cards or a plurality of reader/writers transmits radio wave in communication between known cards and reader/writers, each card or each reader/writer cannot discriminate one reader/writer from another or one card from another. This is called RF collision. To avoid RF collision, individual cards use card identifications (IDs) unique to the individual cards thereof.

When the card ID is used to avoid collision, any reader/writer can read the card ID. A holder of a card ID is easily identified and privacy of the holder can be violated.

Products may be tagged with RFID to show authenticity thereof particularly when the products are rare. The RFID attached to a product is a unique ID. With any reader/writer communicable with the RFID, the activity of a user who purchases the product can be monitored.

Near field communication-interface and protocol (NFCIP) for identifying an IC card and a RFID within a communication coverage area of a reader/writer is standardized as ISO/IEC 18092 (NFCIP-1). According this standard, collision is avoided with the ID unique to the IC card or the RFID untransmitted to the reader/writer.

Japanese Unexamined Patent Application Publication No. 2005-348306 discloses a technique for protecting privacy. According to the disclosure, secret shared information is set up in digital tags of each of the reader/writer and the RFID, and only a reader/writer having the secret shared information can decrypt encrypted information. This technique thus prevents unauthorized tracking, thereby protecting privacy.

SUMMARY OF THE INVENTION

In the NFCIP-1, however, unique ID is not transmitted to the IC card and the RFID. The IC card and the RFID cannot be identified. When each of the IC card and the RFID needs to be identified, a unique ID of the IC card or the RFID may be stored in a data area of each chip, and transmitted to the reader/writer as necessary. In this technique, the unique ID is encrypted to assure secure transmission, and an authentication sequence to exchange session key is required.

The technique disclosed in Japanese Unexamined Patent Application Publication No. 2005-348306 allows the unique ID of the digital tag to be kept secret, but applies to only one way communication. Since identification information needs to be kept secret in the RFID performed in two-way communication, a communication partner cannot be identified.

It is thus desirable to perform safe and convenient communications with a simple arrangement.

In accordance with one embodiment of the present invention, a communication system uniquely identifying a communication partner within a predetermined coverage area and transmitting and receiving information in a predetermined protocol, includes a device and an information processing apparatus with one performing wireless communication with the other within the predetermined coverage area. The device includes a random number generating unit for generating a random number, a device encryption unit for encrypting or decrypting information in accordance with a predetermined algorithm based on a predetermined key, a device secret key storage unit for storing a secret key, the secret key being used by the device encryption unit for encryption and decryption, and being pre-shared with the information processing apparatus, a communication ID transmitting unit for transmitting to the information processing apparatus a response containing a communication ID, the communication ID uniquely identifying the information processing apparatus as a communication partner, and being an ID encrypted from the random number with the secret key by the device encryption unit, the random number being generated by the random number generating unit in response to a poll transmitted from the information processing apparatus, and a device transmitting and receiving unit for transmitting or receiving information to or from the information processing apparatus, the information being encrypted or decrypted by the device encryption unit using as a key the random number generated by the random number generating unit. The information processing apparatus includes an apparatus encryption unit for encrypting or decrypting information in accordance with an algorithm predetermined based on a predetermined key, an apparatus secret key storage unit for storing a secret key, the secret key being used by the apparatus encryption unit for encryption or decryption, and being pre-shared with the device, a communication ID storage unit for storing the communication ID contained in the response transmitted and then received from the device in response to the poll, the communication ID being as an identifier for uniquely identifying the device as a communication partner, a random number acquisition unit for acquiring the random number by decrypting the communication ID with the secret key with the apparatus encryption unit, and an apparatus transmitting and receiving unit for transmitting or receiving information to or from the device, the information being encrypted or decrypted with the random number as a key acquired by the random number acquisition unit with the apparatus encryption unit.

One embodiment of the present invention relates to a communication method of a communication system uniquely identifying a communication partner within a predetermined coverage area and transmitting and receiving information in a predetermined communication protocol, the communication system including a device and an information processing apparatus with one performing wireless communication with the other within the predetermined coverage area. The method including steps of generating a random number, transmitting to the information processing apparatus a response containing a communication ID, the communication ID uniquely identifying the information processing apparatus as a communication partner, and being produced by encrypting in accordance with a predetermined algorithm with a secret key pre-shared with the information processing apparatus a random number generated in response to a poll transmitted from the information processing apparatus, transmitting or receiving information to or from the information processing apparatus, the information being encrypted or decrypted in accordance with the algorithm with the generated random number as a key, storing as an identifier the communication ID contained in the response transmitted and then received from the device in response to the poll, the identifier being used to identify uniquely the device as a communication partner, acquiring the random number by decrypting the communication ID in accordance with a predetermined algorithm using the secret key pre-shared with the device, and transmitting or receiving information to or from the device, the information encrypted or decrypted in accordance with the algorithm using the acquired random number as a key.

In accordance with embodiments of the present invention, the device generates the random number, transmits to the information processing apparatus the response containing the communication ID, the communication ID uniquely identifying the information processing apparatus as the communication partner, and being produced by encrypting in accordance with the predetermined algorithm with the secret key pre-shared with the information processing apparatus the random number generated in response to the poll transmitted from the information processing apparatus, transmits or receives information to or from the information processing apparatus, the information being encrypted or decrypted in accordance with the algorithm with the generated random number as a key. The information processing apparatus stores as the identifier the communication ID contained in the response transmitted and then received from the device in response to the poll, the identifier being used to identify uniquely the device as the communication partner, acquires the random number by decrypting the communication ID in accordance with the predetermined algorithm using the secret key pre-shared with the device, and transmits or receives information to or from the device, the information encrypted or decrypted in accordance with the algorithm using the acquired random number as the key.

One embodiment of the present invention relates to a device in a communication system uniquely identifying a communication partner within a predetermined coverage area and transmitting and receiving information in a predetermined protocol, the communication system including the device and an information processing apparatus with one performing wireless communication with the other within the predetermined coverage area. The device includes a random number generating unit for generating a first random number, a device encryption unit for encrypting or decrypting information in accordance with a predetermined algorithm based on a predetermined key, a device secret key storage unit for storing a secret key, the secret key being used by the device encryption unit for encryption and decryption, and being pre-shared with the information processing apparatus, a communication ID transmitting unit for transmitting to the information processing apparatus a response containing a communication ID, the communication ID uniquely identifying the information processing apparatus as a communication partner, and being an ID encrypted from the first random number with the secret key by the device encryption unit, the first random number being generated by the random number generating unit in response to a poll transmitted from the information processing apparatus, and a device transmitting and receiving unit for transmitting or receiving information to or from the information processing apparatus, the information being encrypted or decrypted by the device encryption unit using as a key the first random number generated by the random number generating unit.

The communication protocol of the communication system may include a near field communication interface and protocol-1 (NFCIP-1) standardized as ISO/IEC 18092. The communication ID transmitting unit may embed as the communication ID an NFC identifier in accordance with NFCIP-1, the NFC identifier being used in RF collision avoidance and single device detection.

The device may further include an ID storage unit for storing a ID unique to the device. When a request to read the unique ID is received from the information processing apparatus, the device encryption unit encrypts the unique ID stored on the ID storage unit using as a key the first random number generated by the random number generating unit and transmits the encrypted unique ID to the information processing apparatus.

The device may further include a determination unit for determining whether the unique ID has been encrypted and then transmitted to the information processing apparatus. When the determination unit determines that the unique ID has been encrypted and transmitted to the information processing apparatus, the device transmitting and receiving unit encrypts or decrypts information to be communicated with the information processing apparatus.

The device transmitting and receiving unit may control the device encryption unit to encrypt or decrypt information to be communicated with the information processing apparatus using the first random number generated by the random number generating unit and a second random number encrypted with the secret key and transmitted from the information processing apparatus during the poll or a next transmission of the poll.

One embodiment of the present invention relates to a communication method of a device in a communication system uniquely identifying a communication partner within a predetermined coverage area and transmitting and receiving information in a predetermined protocol, the communication system including the device and an information processing apparatus with one performing wireless communication with the other within the predetermined coverage area. The method includes steps of generating a random number, transmitting to the information processing apparatus a response containing a communication ID, the communication ID uniquely identifying the information processing apparatus as a communication partner, and being produced by encrypting in accordance with a predetermined algorithm with a secret key pre-shared with the information processing apparatus a random number produced in response to a poll transmitted from the information processing apparatus, and transmitting or receiving information, the information being encrypted or decrypted in accordance with the algorithm using the generated random number as a key.

One embodiment of the present invention relates to a computer readable program for causing a device to perform a communication method of the device in a communication system uniquely identifying a communication partner within a predetermined coverage area and transmitting and receiving information in a predetermined protocol, the communication system including the device and an information processing apparatus with one performing wireless communication with the other within the predetermined coverage area. The computer program includes steps of generating a random number, transmitting to the information processing apparatus a response containing a communication ID, the communication ID uniquely identifying the information processing apparatus as a communication partner, and being produced by encrypting in accordance with a predetermined algorithm with a secret key pre-shared with the information processing apparatus a random number produced in response to a poll transmitted from the information processing apparatus, and transmitting or receiving information, the information being encrypted or decrypted in accordance with the algorithm using the generated random number as a key.

In accordance with embodiments of the present invention, the random number is generated. The response containing the communication ID is transmitted to the information processing apparatus. The communication ID uniquely identifies the information processing apparatus as the communication partner, and is produced by encrypting in accordance with the predetermined algorithm with the secret key pre-shared with the information processing apparatus the random number produced in response to the poll transmitted from the information processing apparatus. The information being encrypted or decrypted in accordance with the algorithm using the generated random number as the key is transmitted or received.

One embodiment of the present invention relates to an information processing apparatus in a communication system uniquely identifying a communication partner within a predetermined coverage area and transmitting and receiving information in a predetermined protocol, the communication system including a device and the information processing apparatus with one performing wireless communication with the other within the predetermined coverage area. The information processing apparatus includes an apparatus encryption unit for encrypting or decrypting information in accordance with a predetermined algorithm based on a predetermined key, an apparatus secret key storage unit for storing a secret key, the secret key being used by the apparatus encryption unit for encryption or decryption, and being pre-shared with the device, a communication ID storage unit for storing a communication ID contained in a response transmitted and then received from the device in response to a poll, the communication ID being as an identifier uniquely identifying the device as a communication partner, a random number acquisition unit for acquiring a first random number by decrypting the communication ID with the secret key with the apparatus encryption unit, and an apparatus transmitting and receiving unit for transmitting or receiving information to or from the device, the information being encrypted or decrypted by the apparatus encryption unit with the first random number acquired by the random number acquisition unit. The communication protocol of the communication system may include a near field communication interface and protocol-1 (NFCIP-1) standardized as ISO/IEC 18092. The communication ID storage unit stores, as the communication ID, an NFC identifier being obtained in the response transmitted from the device in response to the poll and being used in RF collision avoidance and single device detection in NFCIP-1.

The information processing apparatus may further include a random number generating unit for generating a second random number. The apparatus transmitting and receiving unit encrypts the second random number with the secret key and transmits the encrypted second random number to the device during the poll or at a next transmission of the poll, and controls the apparatus encryption unit to encrypt or decrypt information to be communicated with the device using the first random number acquired by the random number acquisition unit and the second random number.

When the unique ID of the device is read, the apparatus transmitting and receiving unit may encrypt or decrypt information to be communicated with the device.

One embodiment of the present invention relates to an information processing method of an information processing apparatus in a communication system uniquely identifying a communication partner within a predetermined coverage area and transmitting and receiving information in a predetermined protocol, the communication system including a device and the information processing apparatus with one performing wireless communication with the other within the predetermined coverage area. The information processing method includes steps of storing a communication ID contained in a response transmitted and then received from the device in response to a poll, the communication ID being an identifier uniquely identifying the device as a communication partner, acquiring a random number by decrypting the communication ID in accordance with an algorithm, the algorithm predetermined using a secret key pre-shared with the device, and transmitting or receiving information to and from the device, the information being encrypted or decrypted in accordance with the algorithm using the acquired random number as a key.

One embodiment of the present invention relates to a computer readable program for causing an information processing apparatus to perform a communication processing method of a communication system uniquely identifying a communication partner within a predetermined coverage area and transmitting and receiving information in a predetermined protocol, the communication system including a device and the information processing apparatus with one performing wireless communication with the other within the predetermined coverage area. The computer readable program includes steps of storing a communication ID contained in a response transmitted and then received from the device in response to a poll, the communication ID being an identifier uniquely identifying the device as a communication partner, acquiring a random number by decrypting the communication ID in accordance with an algorithm, the algorithm predetermined using a secret key pre-shared with the device, and transmitting or receiving information to and from the device, the information being encrypted or decrypted in accordance with the algorithm using the acquired random number as a key.

The communication ID contained in the response transmitted and then received from the device in response to the poll is stored. The communication ID is the identifier uniquely identifying the device as the communication partner. The random number is acquired by decrypting the communication ID in accordance with the algorithm, the algorithm predetermined using a secret key pre-shared with the device. The information being encrypted or decrypted in accordance with the algorithm using the acquired random number as the key is transmitted or received.

One embodiment of the present invention relates to a communication system uniquely identifying a communication partner within a predetermined coverage area and transmitting and receiving information in a predetermined protocol. The communication system includes a device and an information processing apparatus with one performing wireless communication with the other within the predetermined coverage area. The device includes a device random number generating unit for generating a first random number, a device encryption unit for encrypting or decrypting information in accordance with a predetermined algorithm based on a predetermined key, a device secret key storage unit for storing a secret key, the secret key being used by the device encryption unit for encryption and decryption, and being pre-shared with the information processing apparatus, a communication ID transmitting unit for transmitting to the information processing apparatus a response containing a communication ID, the communication ID uniquely identifying the information processing apparatus as a communication partner, and being an ID encrypted from the first random number with the secret key by the device encryption unit, the first random number being generated by the device random number generating unit in response to a poll transmitted from the information processing apparatus, and a device transmitting and receiving unit for controlling the device encryption unit to encrypt or decrypt information to be communicated with the information processing apparatus using the first random number generated by the random number generating unit and a second random number encrypted with the secret key and transmitted from the information processing apparatus during the poll or a next transmission of the poll. The information processing apparatus includes an apparatus random number generating unit for generating the second random number, an apparatus encryption unit for encrypting or decrypting information in accordance with a predetermined algorithm based on a predetermined key, an apparatus secret key storage unit for storing a secret key, the secret key being used by the apparatus encryption unit for encryption or decryption, and being pre-shared with the device, a communication ID storage unit for storing the communication ID contained in the response transmitted and then received from the device in response to the poll, the communication ID being an identifier uniquely identifying the device as a communication partner, a random number acquisition unit for acquiring the first random number by decrypting the communication ID with the secret key with the apparatus encryption unit, and an apparatus transmitting and receiving unit for encrypting the second random number with the secret key and transmitting the encrypted second random number to the device during the poll or a next transmission of the poll, and controlling the device encryption unit to encrypt or decrypt information to be communicated with the device using the first random number acquired by the random number acquisition unit and the second random number.

One embodiment of the present invention relates to a communication method of a communication system uniquely identifying a communication partner within a predetermined coverage area and transmitting and receiving information in a predetermined protocol, the communication system including a device and an information processing apparatus with one performing wireless communication with the other within the predetermined coverage area. The communication method includes steps of generating a first random number, transmitting to the information processing apparatus a response containing a communication ID, the communication ID uniquely identifying the information processing apparatus as a communication partner, and being produced by encrypting in accordance with a predetermined algorithm with a secret key pre-shared with the information processing apparatus the first random number generated in response to a poll transmitted from the information processing apparatus, transmitting or receiving information to or from the information processing apparatus, the information being encrypted or decrypted in accordance with the algorithm using as keys the generated first random number and a second random number encrypted with the secret key and transmitted from the information processing apparatus during the poll or at a next transmission of the poll, generating a second random number, storing the communication ID contained in the response transmitted and then received from the device in response to the poll, the communication ID being an identifier uniquely identifying the device as a communication partner, acquiring the first random number by decrypting the communication ID with the secret key pre-shared with the device in accordance with a predetermined algorithm, and encrypting the second random number with the secret key and transmitting the encrypted secret key to the device during the poll or a next transmission of the poll, and transmitting or receiving information, the information being encrypted or decrypted in accordance with the algorithm using the acquired first random number and the second random number.

In accordance with embodiments of the present invention, the device generates the first random number, transmits to the information processing apparatus the response containing the communication ID, the communication ID uniquely identifying the information processing apparatus as a communication partner, and being produced by encrypting in accordance with the predetermined algorithm with the secret key pre-shared with the information processing apparatus the first random number generated in response to the poll transmitted from the information processing apparatus, and transmits or receives information to or from the information processing apparatus, the information being encrypted or decrypted in accordance with the algorithm using as keys the generated first random number and the second random number encrypted with the secret key and transmitted from the information processing apparatus during the poll or at the next transmission of the poll. The information processing apparatus generates the second random number, stores the communication ID contained in the response transmitted and then received from the device in response to the poll, the communication ID being the identifier uniquely identifying the device as the communication partner, acquires the first random number by decrypting the communication ID with the secret key pre-shared with the device in accordance with a predetermined algorithm, and encrypts the second random number with the secret key and transmits the encrypted secret key to the device during the poll or a next transmission of the poll, and transmits or receives information, the information being encrypted or decrypted in accordance with the algorithm using the acquired first random number and the second random number.

In accordance with embodiments of the present invention, safe and convenient communications can be performed with a simple arrangement.

BRIEF DESCRIPTION OF THE DRAWINGS

FIG. 5 is a flowchart illustrating a communication ID generation process;

FIG. 6 is a flowchart illustrating a random number acquisition process;

FIG. 7 is a flowchart illustrating a card ID transmission process;

FIG. 8 is a flowchart illustrating a card ID decryption process;

FIG. 15 is a flowchart illustrating a polling request generation process;

FIG. 16 is a flowchart illustrating a random number B acquisition process;

DESCRIPTION OF THE PREFERRED EMBODIMENTS

Figure 1:
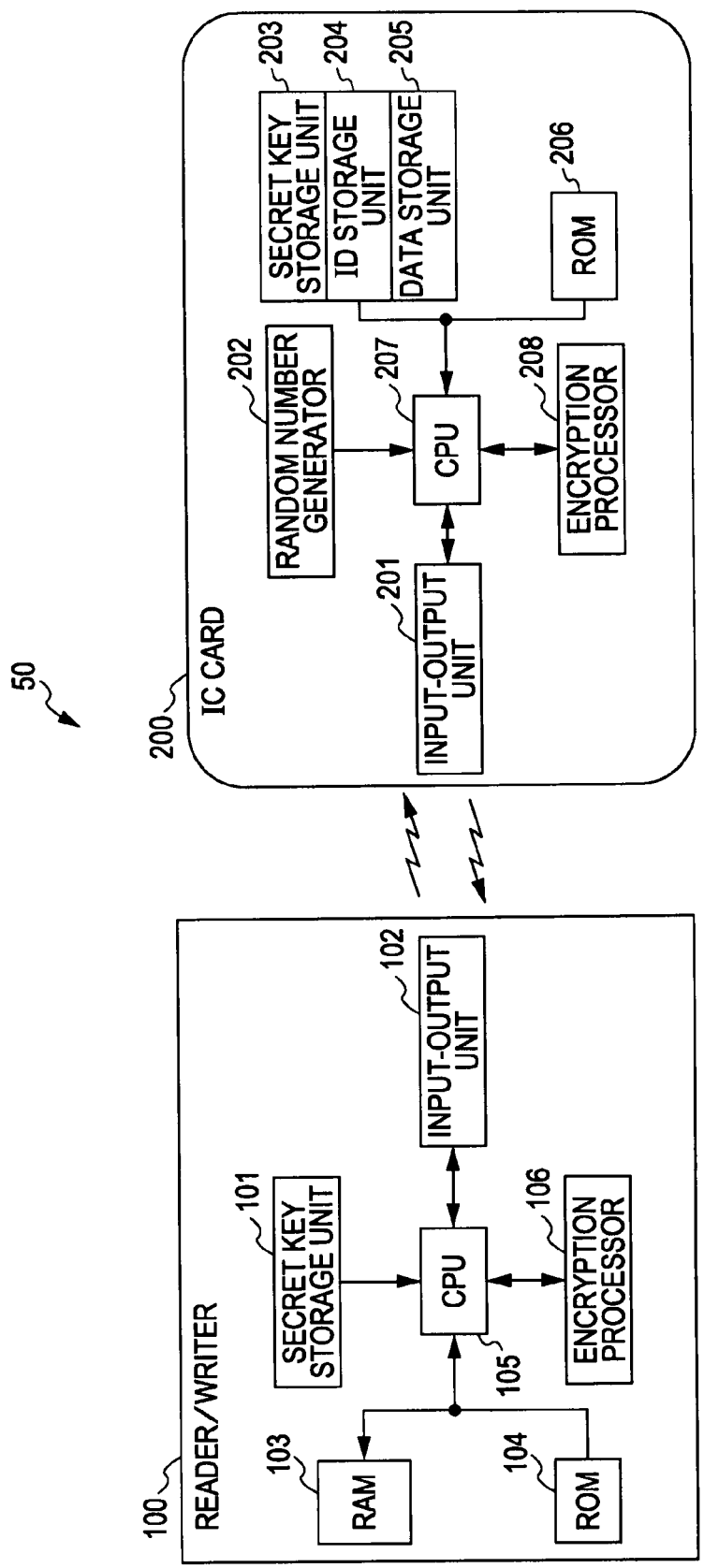
FIG. 1 is a block diagram illustrating a communication system in accordance with one embodiment of the present invention.

Before describing an embodiment of the present invention, the correspondence between the features of the present invention and an embodiment disclosed in the specification or the drawings of the invention is discussed below. This statement is intended to assure that embodiments supporting the claimed invention are described in this specification or the drawings. Thus, even if an embodiment is described in the specification or the drawings, but not described as relating to a feature of the invention herein, that does not necessarily mean that the embodiment does not relate to that feature of the invention. Conversely, even if an embodiment is described herein as relating to a certain feature of the invention, that does not necessarily mean that the embodiment does not relate to other features of the invention.

In accordance with one embodiment of the present invention, a communication system uniquely identifying a communication partner within a predetermined coverage area and transmitting and receiving information in a predetermined protocol, includes a device (for example, IC card 200 of FIG. 1) and an information processing apparatus (for example, reader/writer 100 of FIG. 1) with one performing wireless communication with the other within the predetermined coverage area. The device includes a random number generating unit (for example, random number generator 202 of FIG. 1) for generating a random number, a device encryption unit (for example, encryption processor 208 of FIG. 1) for encrypting or decrypting information in accordance with a predetermined algorithm based on a predetermined key, a device secret key storage unit (for example, secret key storage unit 203 of FIG. 1) for storing a secret key, the secret key being used by the device encryption unit for encryption and decryption, and being pre-shared with the information processing apparatus, a communication ID transmitting unit (for example, CPU 207 of FIG. 1 performing step S103 of FIG. 4) for transmitting to the information processing apparatus a response containing a communication ID, the communication ID uniquely identifying the information processing apparatus as a communication partner, and being an ID encrypted from the random number with the secret key by the device encryption unit, the random number being generated by the random number generating unit in response to a poll transmitted from the information processing apparatus, and a device transmitting and receiving unit (for example, CPU 207 of FIG. 1 performing one of steps S108 and S110 of FIG. 4) for transmitting or receiving information to or from the information processing apparatus, the information being encrypted or decrypted by the device encryption unit using as a key the random number generated by the random number generating unit. The information processing apparatus includes an apparatus encryption unit (for example, encryption processor 208 of FIG. 1) for encrypting or decrypting information in accordance with an algorithm predetermined based on a predetermined key, an apparatus secret key storage unit (for example, secret key storage unit 203 of FIG. 1) for storing a secret key, the secret key being used by the apparatus encryption unit for encryption or decryption, and being pre-shared with the device, a communication ID storage unit (for example, CPU 105 of FIG. 1 performing step S332 of FIG. 6) for storing the communication ID contained in the response transmitted and then received from the device in response to the poll, the communication ID being as an identifier for uniquely identifying the device as a communication partner, a random number acquisition unit (for example, CPU 105 of FIG. 1 performing step S334 of FIG. 6) for acquiring the random number by decrypting the communication ID with the secret key with the apparatus encryption unit, and an apparatus transmitting and receiving unit (for example, CPU 105 of FIG. 1 performing one of steps S206, S209 and S210 of FIG. 4) for transmitting or receiving information to or from the device, the information being encrypted or decrypted with the random number as a key acquired by the random number acquisition unit with the apparatus encryption unit.

One embodiment of the present invention relates to a communication method of a communication system uniquely identifying a communication partner within a predetermined coverage area and transmitting and receiving information in a predetermined communication protocol, the communication system including a device (for example, IC card 200 of FIG. 1) and an information processing apparatus (for example, reader/writer 100 of FIG. 1) with one performing wireless communication with the other within the predetermined coverage area. The method includes steps of generating a random number (for example, in step S301 of FIG. 5), transmitting to the information processing apparatus a response containing a communication ID, the communication ID uniquely identifying the information processing apparatus as a communication partner, and being produced by encrypting in accordance with a predetermined algorithm with a secret key pre-shared with the information processing apparatus a random number generated in response to a poll transmitted from the information processing apparatus (for example, in step S103 of FIG. 4), transmitting or receiving information to or from the information processing apparatus, the information being encrypted or decrypted in accordance with the algorithm with the generated random number as a key (for example, in one of steps S108 and S110 of FIG. 4), storing as an identifier the communication ID contained in the response transmitted and then received from the device in response to the poll, the identifier being used to identify uniquely the device as a communication partner (for example, in step S332 of FIG. 6), acquiring the random number by decrypting the communication ID in accordance with a predetermined algorithm using the secret key pre-shared with the device (for example, in step S334 of FIG. 6), and transmitting or receiving information to or from the device, the information encrypted or decrypted in accordance with the algorithm using the acquired random number as a key (for example, in one of steps S206, S209 and S210 of FIG. 4).

One embodiment of the present invention relates to a device (for example, IC card 200 of FIG. 1) in a communication system uniquely identifying a communication partner within a predetermined coverage area and transmitting and receiving information in a predetermined protocol, the communication system including the device and an information processing apparatus (for example, reader/writer 100 of FIG. 1) with one performing wireless communication with the other within the predetermined coverage area. The device includes a random number generating unit (for example, random number generator 202 of FIG. 1) for generating a first random number, a device encryption unit (for example, encryption processor 208 of FIG. 1) for encrypting or decrypting information in accordance with a predetermined algorithm based on a predetermined key, a device secret key storage unit (for example, secret key storage unit 203 of FIG. 1) for storing a secret key, the secret key being used by the device encryption unit for encryption and decryption, and being pre-shared with the information processing apparatus, a communication ID transmitting unit (for example, CPU 207 of FIG. 1 performing step S103 of FIG. 4) for transmitting to the information processing apparatus a response containing a communication ID, the communication ID uniquely identifying the information processing apparatus as a communication partner, and being an ID encrypted from the first random number with the secret key by the device encryption unit, the first random number being generated by the random number generating unit in response to a poll transmitted from the information processing apparatus, and a device transmitting and receiving unit (for example, CPU 207 of FIG. 1 performing one of steps S108 and S110 of FIG. 4) for transmitting or receiving information to or from the information processing apparatus, the information being encrypted or decrypted by the device encryption unit using as a key the first random number generated by the random number generating unit.

The communication protocol of the communication system may include a near field communication interface and protocol-1 (NFCIP-1) standardized as ISO/IEC 18092. The communication ID transmitting unit may embed as the communication ID an NFC identifier (for example, NFCID 2 of FIG. 3) in accordance with NFCIP-1, the NFC identifier being used in RF collision avoidance and single device detection.

The device may further include an ID storage unit (for example, ID storage unit 204 of FIG. 1) for storing a ID unique to the device. When a request to read the unique ID is received from the information processing apparatus, the device encryption unit encrypts the unique ID stored on the ID storage unit using as a key the first random number generated by the random number generating unit and transmits the encrypted unique ID to the information processing apparatus.

The device may further include a determination unit (for example, CPU 207 of FIG. 1 performing step S29 of FIG. 2) for determining whether the unique ID has been encrypted and then transmitted to the information processing apparatus. When the determination unit determines that the unique ID has been encrypted and transmitted to the information processing apparatus, the device transmitting and receiving unit encrypts or decrypts information to be communicated with the information processing apparatus.

One embodiment of the present invention relates to a communication method of a device (for example, IC card 200 of FIG. 1) in a communication system uniquely identifying a communication partner within a predetermined coverage area and transmitting and receiving information in a predetermined protocol, the communication system including the device and an information processing apparatus (for example, reader/writer 100 of FIG. 1) with one performing wireless communication with the other within the predetermined coverage area. The method includes steps of generating a random number (for example, in step S301 of FIG. 5), transmitting to the information processing apparatus a response containing a communication ID, the communication ID uniquely identifying the information processing apparatus as a communication partner, and being produced by encrypting in accordance with a predetermined algorithm with a secret key pre-shared with the information processing apparatus a random number produced in response to a poll transmitted from the information processing apparatus (for example, in step S103 of FIG. 1), and transmitting or receiving information, the information being encrypted or decrypted in accordance with the algorithm using the generated random number as a key (for example, in one of steps S108 and S110 of FIG. 4).

One embodiment of the present invention relates to an information processing apparatus (for example, reader/writer 100 of FIG. 1) in a communication system uniquely identifying a communication partner within a predetermined coverage area and transmitting and receiving information in a predetermined protocol, the communication system including a device (for example, IC card 200 of FIG. 1) and the information processing apparatus with one performing wireless communication with the other within the predetermined coverage area. The information processing apparatus includes an apparatus encryption unit (for example, encryption processor 208 of FIG. 1) for encrypting or decrypting information in accordance with a predetermined algorithm based on a predetermined key, an apparatus secret key storage unit (for example, secret key storage unit 203 of FIG. 1) for storing a secret key, the secret key being used by the apparatus encryption unit for encryption or decryption, and being pre-shared with the device, a communication ID storage unit (for example, CPU 105 of FIG. 1 performing step S332 of FIG. 6) for storing a communication ID contained in a response transmitted and then received from the device in response to a poll, the communication ID being as an identifier uniquely identifying the device as a communication partner, a random number acquisition unit (for example, CPU 105 of FIG. 1 performing step S334 of FIG. 6) for acquiring a first random number by decrypting the communication ID with the secret key with the apparatus encryption unit, and an apparatus transmitting and receiving unit (for example, CPU 105 of FIG. 1 performing one of steps S206, S209 and S210 of FIG. 4) transmitting or receiving information to or from the device, the information being encrypted or decrypted by the apparatus encryption unit with the first random number acquired by the random number acquisition unit.

The communication protocol of the communication system may include a near field communication interface and protocol-1 (NFCIP-1) standardized as ISO/IEC 18092. The communication ID storage unit stores, as the communication ID, an NFC identifier (for example, NFCID2 of FIG. 3) being obtained in the response transmitted from the device in response to the poll and being used in RF collision avoidance and single device detection in NFCIP-1.

One embodiment of the present invention relates to an information processing method of an information processing apparatus (for example, reader/writer 100 of FIG. 1) in a communication system uniquely identifying a communication partner within a predetermined coverage area and transmitting and receiving information in a predetermined protocol, the communication system including a device (for example, IC card 200 of FIG. 1) and the information processing apparatus with one performing wireless communication with the other within the predetermined coverage area. The information processing method includes steps of storing a communication ID contained in a response transmitted and then received from the device in response to a poll, the communication ID being an identifier uniquely identifying the device as a communication partner (for example, in step S332 of FIG. 6), acquiring a random number by decrypting the communication ID in accordance with an algorithm, the algorithm predetermined using a secret key pre-shared with the device (for example, in step S334 of FIG. 6), and transmitting or receiving information to and from the device, the information being encrypted or decrypted in accordance with the algorithm using the acquired random number as a key (for example, in one of steps S206, S209 and S210 of FIG. 4).

The embodiments of the present invention are described below with reference to the drawings.

FIG. 1 is a block diagram illustrating a communication system 50 in accordance with one embodiment of the present invention. As shown in FIG. 1, the communication system 50 includes a reader/writer 100, and an IC card 200. The reader/writer 100 and the IC card 200 communicate each other in a wireless fashion using antennas thereof.

An input-output unit 102 in the reader/writer 100 transmits a predetermined radio wave and detects a change in a load on the antenna thereof when the radio wave is transmitted. The input-output unit 102 thus detects the IC card 200 when the IC card 200 is close thereto. The reader/writer 100 has the antenna that transmits and receives a variety of data to and from the IC card 200 when the IC card 200 approaches the reader/writer 100. The input-output unit 102 amplitude shift keying (ASK) modulates a carrier at a predetermined frequency supplied from an oscillator (OSC) circuit in accordance with data supplied from the CPU 105, and outputs the modulated wave from the antenna as the radio wave. The input-output unit 102 also demodulates an ASK modulated wave received via the antenna, and supplies the demodulated data to the CPU 105.

A central processing unit (CPU) 105 in the reader/writer 100 loads a program stored on a read-only memory (ROM) 104 to a random-access memory (RAM) 103, thereby performing a variety of processes. The RAM 103 stores data required for the CPU 105 to perform the variety of processes.

The CPU 105 controls an encryption processor 106, thereby encrypting or decrypting data in accordance with a predetermined encryption algorithm. The encryption algorithm of the encryption processor 106 is the one of secret key cryptosystem, such as data encryption standard (DES), triple DES, or advanced encryption standard (AES).

When the reader/writer 100 encrypts or decrypts data, the CPU 105 supplies to the encryption processor 106 a secret key stored on the secret key storage unit 101 together with data being encrypted or decrypted. The encryption processor 106 thus encrypts or decrypts the supplied data using the supplied secret key.

The secret key stored on the secret key storage unit 101 is identical to the secret key stored on a secret key storage unit 203 in the IC card 200. The secret key is pre-stored on only the reader/writer 100 that corresponds to the IC card 200 and is permitted to read a card identification (ID) unique to the IC card 200.

An input-output unit 201 in the IC card 200 includes an inductor-capacitor (LC) circuit composed of a coiled antenna and a capacitor. The LC circuit in the input-output unit 201 is designed to resonate with a radio wave at a predetermined frequency transmitted from the reader/writer 100 placed nearby. The input-output unit 201 ASK demodulates an electrical signal generated in response to an alternating electromagnetic field excited in the antenna, thereby rectifying the electrical signal. The input-output unit 201 regulates the rectified electrical signal, and supplies the regulated electrical signal as direct current power to each section in the IC card 200. The power of the radio wave transmitted from the reader/writer 100 is adjusted so as to generate the electromagnetic field sufficient to power the IC card 200.

The input-output unit 201 thus envelop detects the ASK modulated wave received via the antenna, binary phase shifting keying (BPSK) demodulates the ASK demodulated signal, and supplies the BPSK demodulated signal to the CPU 207. The input-output unit 201 generates a clock signal having the same frequency as the clock signal of the received signal, and supplies the generated clock signal to the CPU 207.

To transmit predetermined information to the reader/writer 100, the input-output unit 201 ASK modulates BPSK modulated data supplied from the CPU 207 in response to variations in the load of the antenna, and then transmits the modulated component to the reader/writer 100 via the antenna.

The input-output unit 201 in the IC card 200 performs a variety of programs stored on the ROM 206. The secret key storage unit 203, an ID storage unit 204 and a data storage unit 205 are arranged in respective portions thereof in an electrically erasable programmable read-only memory (EEPROM).

The CPU 207 encrypts or decrypts data in accordance with a predetermined encryption algorithm by controlling an encryption processor 208. The encryption algorithm of the encryption processor 208 is one of the secret key cryptosystm and identical to the encryption algorithm of the encryption processor 106.

When the IC card 200 encrypts or decrypts data, the CPU 207 supplies the secret key stored on the secret key storage unit 203 to the encryption processor 208 together with data being encrypted or decrypted. The encryption processor 208 thus encrypts or decrypts the supplied data in accordance with the supplied secret key.

A random number generator 202 generates a random number of a predetermined digit as necessary. As will be described later, the random number is used, in communications between the IC card 200 and the reader/writer 100, as a session ID mutually identifying communication partners and as a session key used to encrypt or decrypt data communicated in the session.

The ID storage unit 204 stores a card ID as identification information unique to the IC card 200.

The data storage unit 205 stores, as necessary, application data to be used to provide a variety of services of the IC card 200.

Each of the encryption processor 106 and the encryption processor 208 may be implemented using software.

Since the reader/writer 100 and the IC card 200 perform wireless communications, collision can take place. In collision, each of IC cards or readers/writers is unable to identify which of the readers/writers or the IC cards transmits radio wave. However, in the communication system 50, each of the reader/writer 100 and the IC card 200 performs communications complying with near field communication-interface and protocol (NFCIP) that can identify an IC card or RFID placed within a communication coverage of the reader/writer.

The NFCIP-1 standard incorporates an RF detection and collision avoidance mechanism to allow an NFCIP-1 device to communicate in a frequency band in which another device also works. An NFCID (NFC identifier) and an NFC device identifier are used in the NFCIP-1 standard. The NFCID is an NFC device identifier using a random number for collision avoidance and a single device detection process. In known typical communication systems, an ID unique to an IC card is transmitted to a reader/writer, and the reader/writer identifies the IC card based on that ID for collision avoidance purposes. The NFCIP-1 standard does not require that the ID unique to the IC card be transmitted to the reader/writer.

In the communication system 50, each of the reader/writer 100 and the IC card 200 identifies the communication partner for collision avoidance without the need for the IC card 200 transmitting the unique card ID to the reader/writer 100.

The NFCIP-1 standard is detailed in ISO/IEC 18092 specification.

In the discussion that follows, the reader/writer 100 functions as an initiator defined in the NFCIP-1 standard and the IC card 200 functions as a target defined in the NFCIP-1 standard. During a passive communication mode of the NFCIP-1 standard, each of the initiator and the target complies with a data rate of 106 kb/s or one of data rates of 212 kb/s and 424 kb/s. It is now assumed that each of the initiator and the target works at one of the data rates of 212 kb/s and 424 kb/s.

As described above, the communication system 50 performs wireless communications with no unique card ID transmitted from the IC card 200 to the reader/writer 100. The communication system 50 thus provides privacy protection. However, services using the IC card still require a mechanism that uniquely identifies individual IC cards. In accordance with one embodiment of the present invention, the IC card 200 still incorporates a mechanism to transmit the card IC unique to the IC card 200 to the reader/writer 100.

Figure 2:
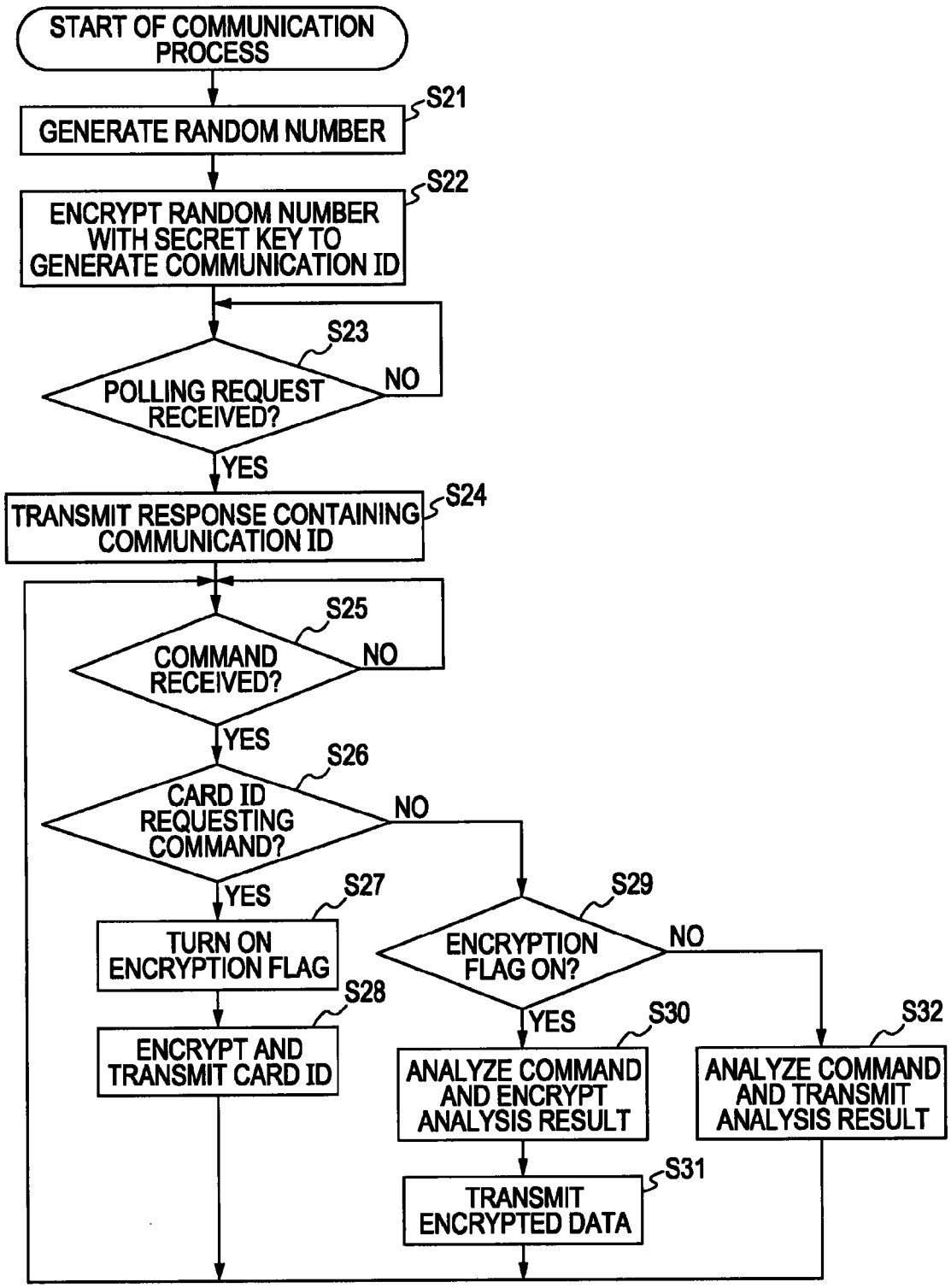
FIG. 2 is a flowchart illustrating a communication process with an IC card of FIG. 1.

FIG. 2 is a flowchart illustrating a communication process of the IC card 200 of FIG. 1. For example, the communication process is started when power generated by an AC magnetic field excited in the antenna of the input-output unit 201 is fed to each section of the IC card 200 with the IC card 200 placed close to the antenna of the reader/writer 100.

In step S21, the random number generator 202 generates a random number. The random number generated here is stored in a predetermined area on the data storage unit 205.

In step S22, the encryption processor 208 encrypts the random number generated in step S21 with a secret key stored on the secret key storage unit 203 to generate a communication ID.

In step S23, the CPU 207 determines whether a polling request has been received from the reader/writer 100. The CPU 207 waits on standby until a poll request has been received from the reader/writer 100. If it is determined in step S23 that the poll request has been received, processing proceeds to step S24.

In step S24, the CPU 207 transmits to the reader/writer 100 a polling response in reply to the poll request determined to be received in step S23. The response contains the communication ID generated in step S22.

Figure 3:
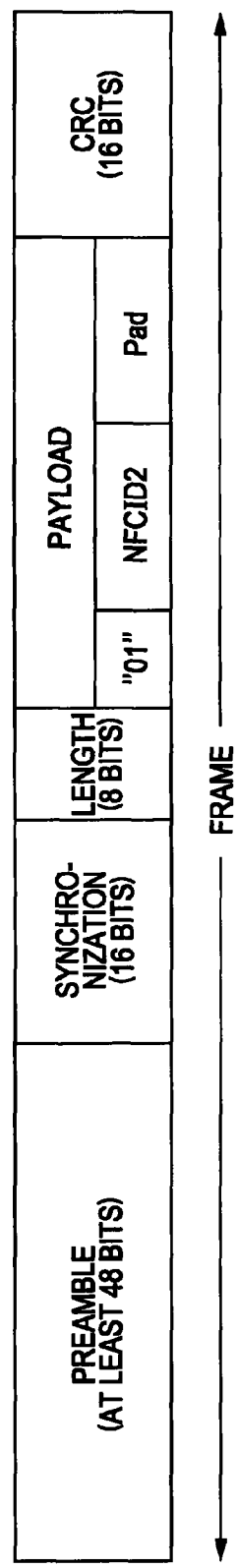
FIG. 3 illustrates a response form format defined by NFCIP-1.

FIG. 3 illustrates a format of a frame of the response, defined in the NFCIP-1 standard, storing data of the transmitted response. The response frame is transmitted from the target in response to the poll request from the initiator when each of the initiator and the target functions at one of data rates of 212 kb/s and 424 kb/s.

A "preamble" field shown stores data of at least 48 bit of data all having logical "0." A "synchronization pattern" stores data of 2 bytes (16 bits) to be used for synchronization in communications between the initiator and the target. A "length" field stores data of 8 bits indicating a value of "12." A "payload" field stores data composed of a start byte of "01," 8 bytes of NFCID 2, and 8 bytes of Pad. A "cyclic redundancy check (CRC)" field stores data for error check, calculated in a predetermined method.

In step S24, the communication ID is stored as the NFCID 2 in the payload field. The response frame is thus transmitted.

As described above, the communication ID is an encrypted random number. The reader/writer 100 corresponding to the IC card 200 and permitted to read the card ID of the IC card 200 stores the same key on the secret key storage unit 101 as the one stored on the secret key storage unit 203. The reader/writer 100 decrypts the value of the NFCID 2 (communication ID) of the response frame transmitted in step S24, thereby acquiring the random number generated by the IC card 200 in step S21.

Returning to FIG. 2, the CPU 207 determines in step S25 subsequent to step S24 whether a command has been received from the reader/writer 100. The CPU 207 waits on standby until it is determined that a command has been received from the reader/writer 100. The reader/writer 100 transmits a predetermined command to the IC card 200 to read data stored on the IC card 200 or to write data on the IC card 200. If it is determined in step S25 that a command has been received from the reader/writer 100, processing proceeds to step S26.

In step S26, the CPU 207 determines whether the command received in step S25 is a command requesting the transmission of the card ID unique to the IC card 200. If it is determined in step S26 that the command is a command requesting the transmission of the card ID, processing proceeds to step S27.

In step S27, the CPU 207 sets an encryption flag to ON. Data to be transmitted in the subsequent process is thus to be encrypted. The encryption flag is a bit in a predetermined area in the data storage unit 205. A default setting of the encryption flag is "0 (OFF)." Once the encryption flag is set to ON, the encryption flag remains to be ON until power supplying to the IC card 200 is stopped, i.e., until the IC card 200 moves out of a communication coverage area of the reader/writer 100.

In step S28, the CPU 207 reads the card ID stored on the ID storage unit 204, controls the encryption processor 208 to encrypt the card ID with the random number as a key generated in step S21, and transmits the encrypted card ID to the reader/writer 100. In this way, when a transmission request requesting the transmission of the card ID has been received from the reader/writer 100, the IC card 200 encrypts the card ID with the random number as a key and transmits the encrypted card ID to the reader/writer 100.

With the random number acquired as described above, the reader/writer 100 can decrypt the data transmitted in step S28, thereby acquiring the card ID.

Processing returns to step S25 subsequent to step S28 to perform steps S25 and S26. If it is determined in step S26 that the command is not a command requesting the transmission of the card ID, processing proceeds to step S29. The command received from the reader/writer 100 might be a read request requesting the reading of predetermined data stored on the data storage unit 205.

In step S29, the CPU 207 determines whether the encryption flag is ON. If it is determined in step S29 that the encryption flag is ON, processing proceeds to step S30.

In step S30, the CPU 207 analyzes the command determined to be received in step S25, performs a predetermined process, and encrypts the process results. In this case, the data stored on the predetermined area of the data storage unit 205 is read in response to the command from the reader/writer 100. The encryption processor 208 encrypts the read data. An encryption key used in the encryption process here is the random number generated in step S21.

In step S31, the CPU 207 transmits the data encrypted in step S30 to the reader/writer 100. Upon decrypting the transmitted data, the reader/writer 100 reads the data stored on the IC card 200.

If it is determined in step S29 that the encryption flag is not ON, processing proceeds to step S32.

In step S32, the CPU 207 analyzes the command determined to be received in step S25, performs a predetermined process, and transmits process result data. Data stored on the predetermined area of the data storage unit 205 is read in response to the command from the reader/writer 100. The read data is then transmitted to the reader/writer 100.

In the process discussed above, the command to read the data stored on the IC card 200 is received from the reader/writer 100. When a command to store (write) data on the IC card 200 is received from the reader/writer 100, data to be written is transmitted from the reader/writer 100, and the data is then written on the IC card 200.

Since the data to be transmitted is not encrypted in step S32, the reader/writer 100 does not need to decrypt the received data. If the request for transmission of the card ID has not been received from the reader/writer 100, the encryption flag is not set to ON. Encryption is not performed on the data to be communicated between the reader/writer 100 and the IC card 200.

Subsequent to one of steps S31 and S32, processing returns to step S25. The above-described process is repeated until the IC card 200 moves out of the communication coverage area of the reader/writer 100.

The communication process of the IC card 200 is thus performed. If a mechanism to identify uniquely the individual IC cards in the service provided by the reader/writer 100 is required, the card ID is encrypted and transmitted to the IC card 200. Any reader/writers other than the reader/writer 100 that is permitted to read the card ID of the IC card cannot acquire the card ID. The communication system 50 can thus becomes a safe and privacy protected communication system.

A reader/writer not permitted to read a card ID of an IC card but complying with the NFCIP-1 standard can still exchange data with the IC card 200. When it is not necessary to identify uniquely the individual IC cards in the service provided by the reader/writer 100, each IC card works without any problem.

In the example of FIG. 3, each of the initiator and the target works at one of the data rates of 212 kb/s and 424 kb/s, and the communication ID is used as NFCID 2. If each of the initiator and the target works at a data rate of 106 kb/s, the communication ID is NFCID 1 defined in the NFCIP-1 standard.

The communication process performed between the reader/writer 100 and the IC card 200 is described in detail below with reference to a flowchart of FIG. 4. A data read operation and a data write operation are performed in succession to the card ID read process performed between the reader/writer 100 permitted to read the card ID of the IC card 200 and the IC card 200.

For example, the IC card 200 is placed close to the antenna of the reader/writer 100 and power generated by the AC magnetic field excited in the antenna of the IC card 200 is fed to each section of the IC card 200. The IC card 200 performs step S101, thereby generating the random number.

Figure 4:
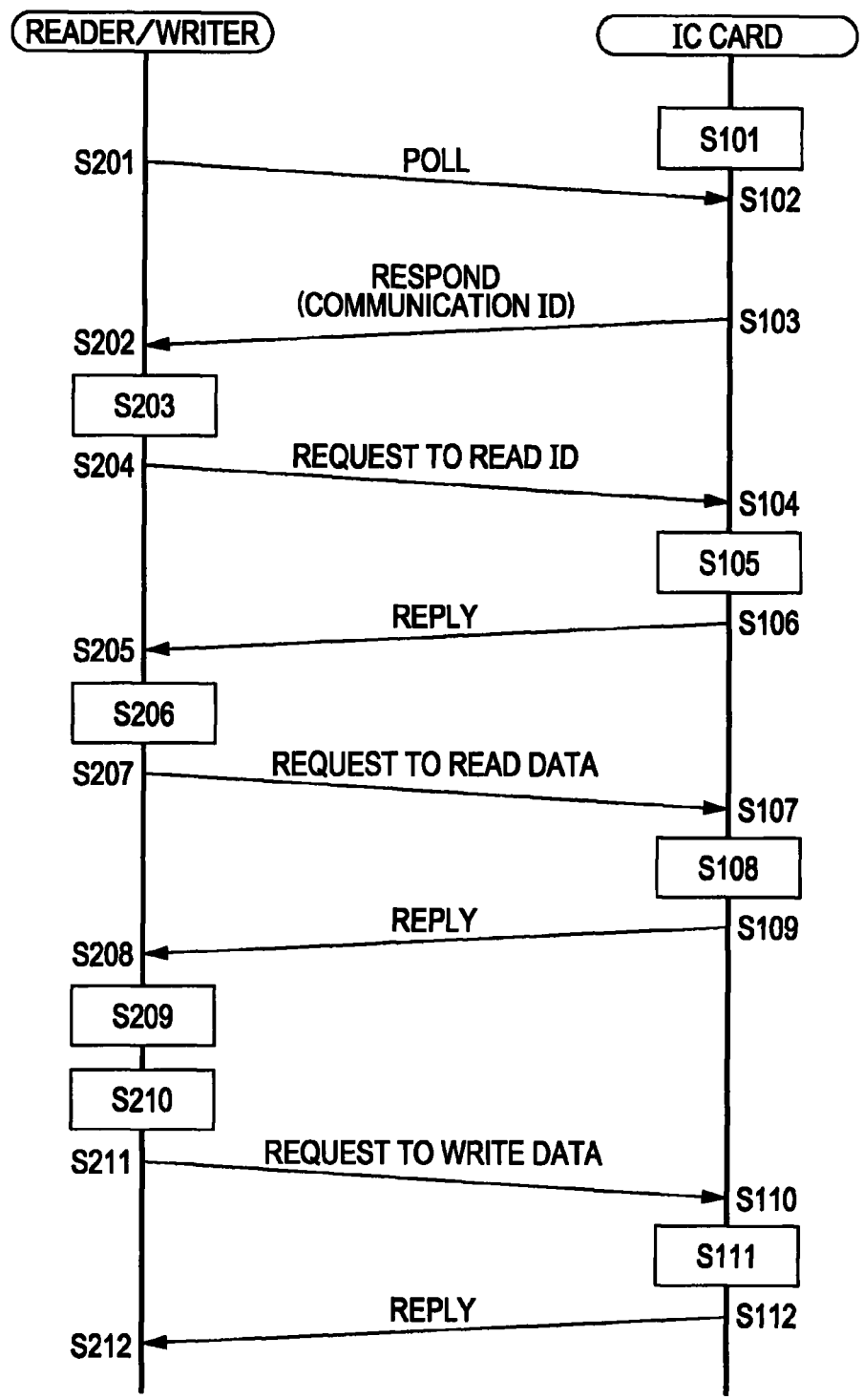
FIG. 4 is a flowchart illustrating communications performed between a reader/writer and the IC card shown in FIG. 1.

The communication ID generation process performed in step S101 of FIG. 4 is described below with reference to a flowchart of FIG. 5.

In step S301, the random number generator 202 generates a random number A.

In step S302, the CPU 207 stores the random number A generated in step S301 on a predetermined area of the data storage unit 205.

In step S303, the encryption processor 208 encrypts the random number A generated in step S301 using the key stored on the secret key storage unit 203.

In step S304, the CPU 207 stores the process result in step S303 (i.e., encrypted random number A) as the communication ID on a predetermined area of the data storage unit 205.

The process performed in steps S301 through S304 is identical to the process performed in steps S21 and S22.

Returning to FIG. 4, in step S201, the reader/writer 100 transmits a polling request to the IC card 200 which the reader/writer 100 can communicate with. In step S102, the IC card 200 receives the polling request.

In step S103, the IC card 200 transmits to the reader/writer 100 a response responsive to the polling request received in step S102. As previously discussed with reference to FIG. 3, the communication ID stored as the NFCID 2 in the predetermined area of the response frame in step S304 is embedded in a response frame to be transmitted to the reader/writer 100. Steps S102 and S103 are identical to steps S23 and S24 of FIG. 2, respectively. The reader/writer 100 receives the response frame in step S202.

In step S203, the reader/writer 100 decrypts the communication ID in the response frame transmitted from the IC card 200, thereby acquiring the random number A.

The random number generation process performed in step S203 of FIG. 4 is described below with reference to a flowchart of FIG. 6.

In step S331, the CPU 105 acquires the communication ID (i.e., encrypted random number A) contained in the response frame received from the IC card 200 in step S202.

In step S332, the CPU 105 stores the communication ID acquired in step S331 on a predetermined area of the RAM 103, for example.

In step S333, the encryption processor 106 decrypts the random number A as the communication ID acquired in step S331 using the key stored on the secret key storage unit 101. As previously discussed, the encryption processor 106 performs the encryption process or the decryption process in accordance with the same algorithm as the one for the encryption processor 208. The secret key storage unit 101 of the reader/writer 100 permitted to read the card ID of the IC card 200 stores the same key as the key stored on the secret key storage unit 203. In step S333, the random number A generated by the IC card 200 in step S301 is thus decrypted and acquired.

In step S334, the CPU 105 stores the random number A acquired in step S333 on a predetermined area of the RAM 103.

The reader/writer 100 and the IC card 200 mutually identify each other in accordance with the communication ID, and encrypt or decrypt data as necessary using the random number A as a key. A session ID (the communication ID in this case) required for communication and a session key (the random number A) are thus exchanged between the reader/writer 100 and the IC card 200.

Returning to in FIG. 4, the reader/writer 100 transmits a frame containing a command requesting the reading of the card ID to the IC card 200 in step S204. In this case, the communication ID stored in step S332 is embedded in the frame as an identifier for IC card 200 to identify uniquely the frame transmitted from the reader/writer 100. In accordance with the NFCIP-1 standard, the communication ID is embedded in a transport data field of a transfer frame defined in the NFCIP-1 standard. In step S104, the IC card 200 receives the frame.

In step S105, the IC card 200 performs a process responsive to the command transmitted from the reader/writer 100. In this case, the process responsive to the command to read the card ID is performed.

The card ID transmission process performed in step S105 of FIG. 4 is described below with reference to a flowchart of FIG. 7.

In step S361, the CPU 207 reads the card ID stored on the ID storage unit 204.

In step S362, the encryption processor 208 encrypts the card ID read in step S361 using the random number A stored in step S302.

In step S363, the CPU 207 acquires the process result in step S362 (encrypted card ID).

Returning to FIG. 4, in step S106 subsequent to step S105 the IC card 200 transmits a frame, containing the data acquired in step S363, as a response responsive to the command to read the card ID from the reader/writer 100 read in step S104. The communication ID stored in step S304 is embedded as an identifier for the reader/writer 100 to identify uniquely the frame transmitted from the IC card 200. The process in steps S104 through S106 is identical to the process in steps S25 through S28. The reader/writer 100 reads this frame in step S205 of FIG. 4.

Since the card ID is read in response to the command to read the card ID from the reader/writer 100, the encryption flag is set to ON in the IC card 200 (in step S27 of FIG. 2). In the subsequent data read and write process, data is transmitted or received in the encrypted form thereof.

In step S206, the reader/writer 100 decrypts the encrypted card ID.

The card ID decryption process in step S206 of FIG. 4 is described below with reference to a flowchart of FIG. 8.

In step S391, the CPU 105 acquires the encrypted data contained in the frame received in step S205.

In step S392, the encryption processor 106 decrypts the data acquired in step S391 using as a key the random number A stored in step S334.

In step S393, the CPU 105 acquires data resulting from step S392 as the card ID. In this way, the reader/writer 100 acquires the card ID unique to the IC card 200. The reader/writer 100 performs a process to provide service that uses the card ID.

Returning to FIG. 4, the reader/writer 100 transmits a frame to the IC card 200 in step S207 subsequent to step S206. The frame contains a command to read data stored on the IC card 200 (the data required in the process of the service provided by the reader/writer 100). The communication ID stored in step S332 is embedded in the frame as an identifier for the IC card 200 to identify uniquely the frame transmitted from the reader/writer 100. In step S107, the IC card 200 receives that frame.

In step S108, the IC card 200 performs the process responsive to the command transmitted from the reader/writer 100. In this case, the process responsive to the command to read data is performed.

Figure 9:
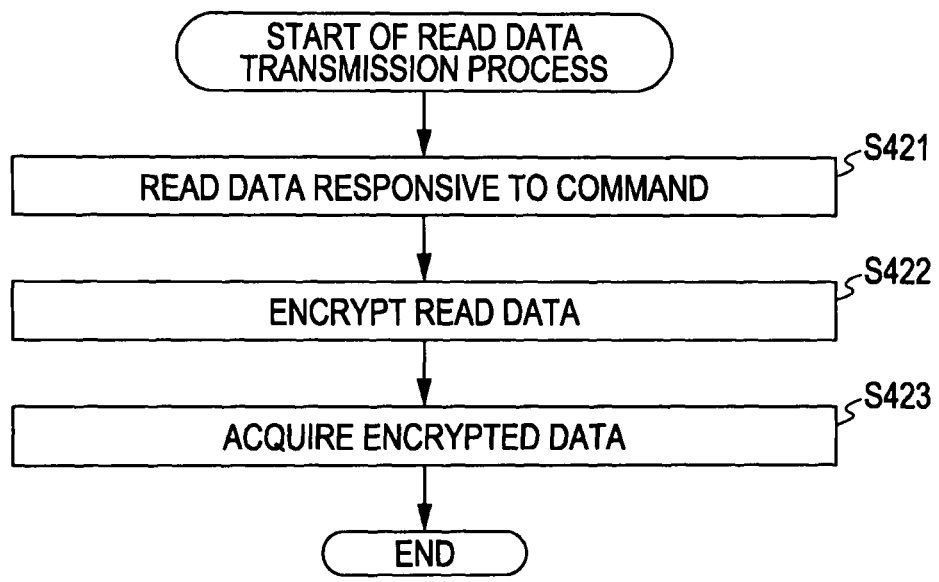
FIG. 9 is a flowchart illustrating a read data transmission process.

The read data transmission process performed in step S108 of FIG. 4 is described below with reference to a flowchart of FIG. 9.

In step S421, the CPU 207 reads data requested from the reader/writer 100 out of the data stored on the data storage unit 205.

In step S422, the encryption processor 208 encrypts the data read in step S421 using the random number A stored in step S302.

In step S423, the CPU 207 acquires the data resulting from step S422 (encrypted data).

Returning to FIG. 4, the CPU 207 transmits in step S109 the frame containing the data acquired in step S423 as a reply to the command to read data from the reader/writer 100 in step S107. In this case, as well, the communication ID stored in step S304 is embedded in the frame as an identifier for the reader/writer 100 to identify uniquely the frame transmitted from the IC card 200. The process in steps S107 and S108 is identical to the process in steps S25, S26 and S29 through S31. In step S208 of FIG. 4, the reader/writer 100 receives that frame.

In step S209, the reader/writer 100 demodulates the data received from the IC card 200. This process is identical to the process discussed with reference to FIG. 8, and the detailed discussion thereof is not repeated herein. In this process, instead of the card ID, the data required in the processing of the service provided by the reader/writer 100 is decrypted using the random number A.

In step S210, the reader/writer 100 performs a process to cause the IC card 200 to store data.

Figure 10:
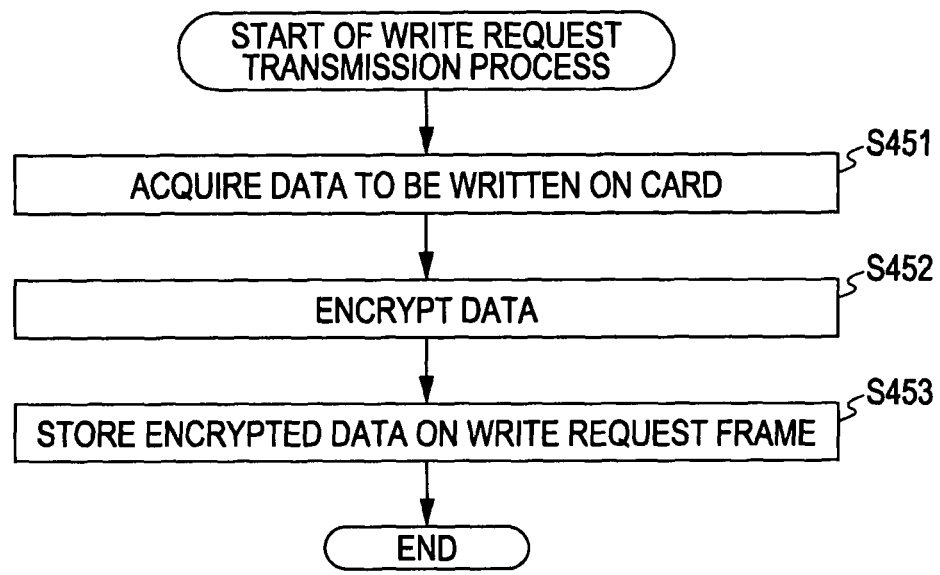
FIG. 10 is a flowchart illustrating a write request transmission process.

The write request transmission process performed in step S210 of FIG. 4 is described below with reference to a flowchart of FIG. 10.

In step S451, the CPU 105 acquires data resulting from an application program executed by the reader/writer 100 and to be stored onto the IC card 200.

In step S452, the encryption processor 106 encrypts the data acquired in step S451 using the random number A stored in step S334.

In step S453, the CPU 105 stores the data resulting from step S452 (encrypted data) together with the write request command in a frame.

Returning to FIG. 4, the reader/writer 100 transmits in step S211 subsequent to step S210 the frame of the write request containing the data encrypted in step S453 to the IC card 200. The communication ID stored in step S332 is also embedded as an identifier for IC card 200 to identify uniquely the frame transmitted from the reader/writer 100. In step S110, the IC card 200 receives that frame.

In step S111, the IC card 200 performs the process responsive to the command transmitted from the reader/writer 100. The process responsive to the data write command is performed.

Figure 11:
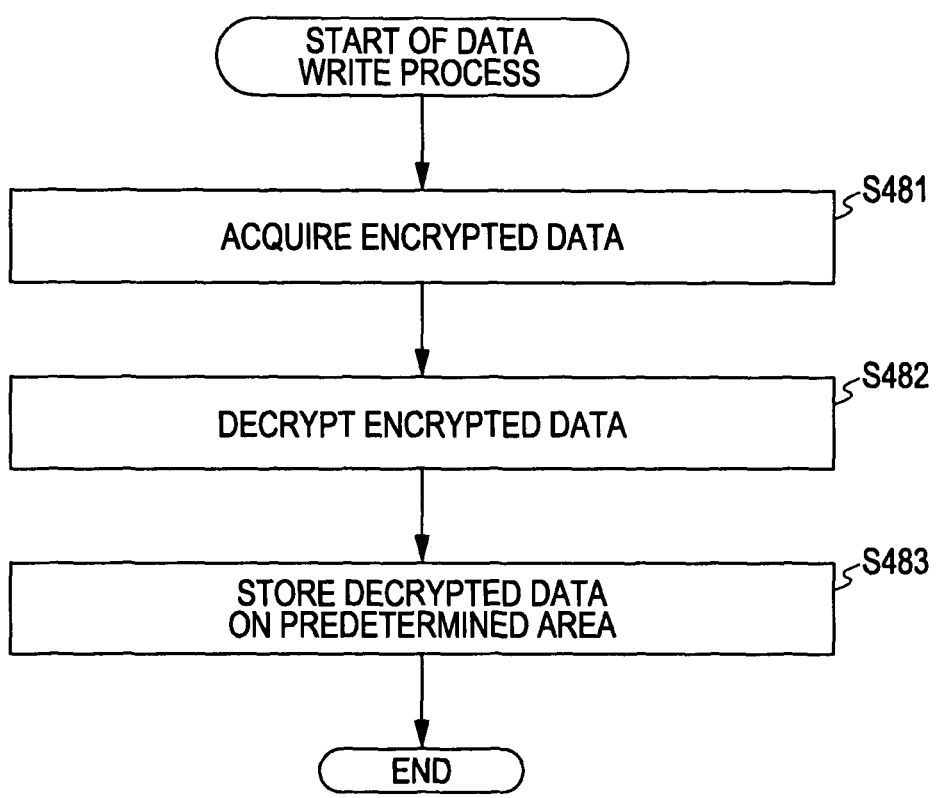
FIG. 11 is a flowchart illustrating a data write process.

The data write process performed in step S111 of FIG. 4 is described below with reference to a flowchart of FIG. 11.

In step S481, the CPU 207 acquires the encrypted data contained in the frame received in step S110.

In step S482, the encryption processor 208 encrypts the data acquired in step S481 with the random number A stored in step S302.

In step S483, the CPU 207 stores the data resulting from step S482 (encrypted data) onto a predetermined area of the data storage unit 205, thereby performing the write process.

Returning to FIG. 4, the IC card 200 transmits in step S112 subsequent to step S111 to the reader/writer 100 a frame containing the data resulting from step S483. The transmitted frame contains data indicating whether the data has been successfully written or not. The communication ID stored in step S304 is also embedded in the frame as an identifier for the reader/writer 100 to identify uniquely the frame transmitted from the IC card 200. In step S212, the reader/writer 100 receives that frame.

After reading the card ID, data reading and then data writing are performed. The data reading and the data writing are not limited to this order. The order may be modified as necessary.

Communications are thus performed between the IC card 200 and the reader/writer 100 that is permitted to read the card ID of the reader/writer 100. The encrypted card ID is transmitted to the reader/writer 100, and all data is encrypted in the data reading and the data writing performed subsequent to the card ID reading. The communication system 50 thus becomes secure and free from user privacy violation.

The data communicated may be encrypted with the key stored on the secret key storage unit 101 and the secret key storage unit 203. To transmit and receive data in a secure manner, each IC card needs to have a different secret key. AS a result, the reader/writer 100 is forced to memorize numerous keys for individual IC cards, and has difficulty managing keys.

In accordance with one embodiment of the present invention, not only the communication ID is exchanged between the reader/writer 100 and the IC card 200 as a session ID (identifier), but also the random number A acquired by decrypting the communication ID is shared between the reader/writer 100 and the IC card 200 without any knowledge of a third party. The random number A is generated each time the IC card 200 communicates with the reader/writer 100. If an arrangement is made beforehand that the random number A is to be used as a key for encryption or decryption in subsequent communications, en encryption communication is performed using a session key (random number A) different each time communication is made. Encryption with the session key is thus performed without the need for storing a vast amount of key data for individual IC cards on the reader/writer 100. The communication system 50 becomes a secure system with a simple design.

A reader/writer not permitted to read the card ID of the IC card 200 does not store the same key as the one stored on the secret key storage unit 203. Even if the reader/writer makes a card ID transmission request, no random number is decrypted from the communication ID, and the card ID cannot be acquired by decrypting the card ID transmitted in the form encrypted with the random number as a key.

In accordance with one embodiment of the present invention, the reader/writer 100 (initiator) and the IC card 200 (target) simply perform communications complying with the NFCIP-1 standard, and are not required to perform any additional process such as a hand-shake protocol for session key exchange.

The NFCIP-1 standard defines the use of an NFC identifier (for example, NFCID 2 of FIG. 3) as an NFC device identifier that uses a random number for collision avoidance and single device detection process. The random number generator 202 (or equivalent element) is originally included in the IC card 200 complying with the NFCIP-1 standard. The communication ID used in the embodiments of the present invention is simply an encrypted random number generated in the target. An encryption process is newly arranged but there is no need for introducing an additional process in the exchange of the communication ID as the session ID.

In accordance with one embodiment of the present invention, the random number obtained by decrypting the communication ID is used as a session key. When the polling request is transmitted from the initiator complying with the NFCIP-1 standard and the polling response is transmitted from the target, the session key together with the communication ID is exchanged. Any additional process is not required.

In accordance with embodiments of the present invention, the IC card 200 can perform processes without being aware of the type of the reader/writer, i.e., as to whether the reader/writer is a particular reader/writer or a generally available reader/writer. The particular reader/writer is the one permitted to read the card ID of the IC card and communicates data in the encrypted form thereof. The generally available reader/writer is the one not permitted to read the card ID of the IC card and communicates data without being encrypted. The IC card of one embodiment of the present invention can communicate with a reader/writer without any problem if the reader/writer functions as an initiator complying with the NFCIP-1 standard. The IC card 200 thus provides device compatibility.

A communication process performed between the IC card 200 of one embodiment of the present invention and a generally available reader/writer (not shown) is described below with reference to a flowchart of FIG. 12. The generally available reader/writer is not permitted to read the card ID of the IC card 200. In this communication process, data is exchanged without being encrypted.

Steps S121 through S123 are respectively identical to steps S101 through S103 of FIG. 4. Steps S221 and S222 are respectively identical to steps S201 and S202 of FIG. 4.

Figure 12:
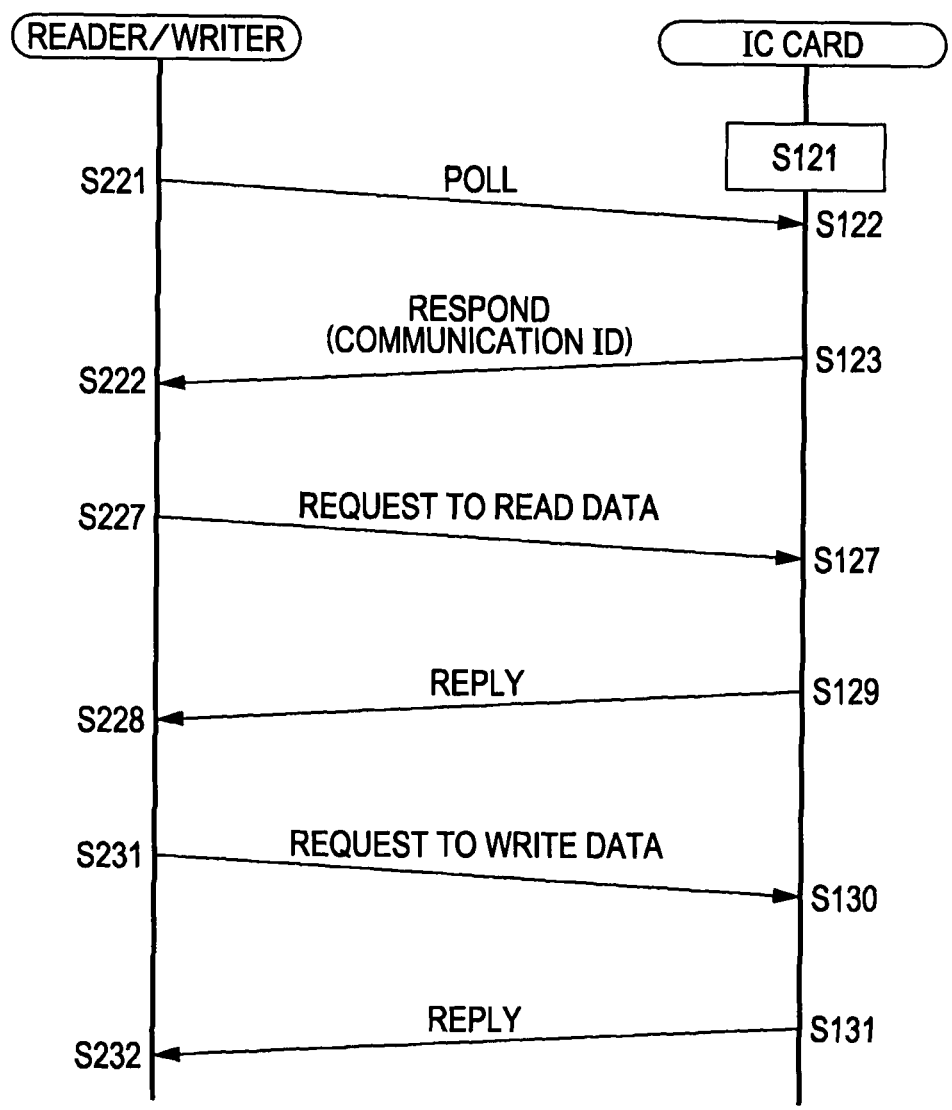
FIG. 12 is a flowchart illustrating in detail communications performed between the IC card of one embodiment of the present invention and a known reader/writer.

Unlike in the sequence of FIG. 4, the reader/writer does not decrypt the communication ID contained in the response received from the IC card 200 in step S222 in the process of FIG. 12. The request to read the card ID is not transmitted from the reader/writer to the IC card 200, and no response is transmitted from the IC card 200. More specifically, the process corresponding to steps S203 through S205 and steps S104 through S106 of FIG. 4 is not performed in the sequence of FIG. 12.

Since the reader/writer issues no request to read the card ID, the IC card 200 does not set the encryption flag to ON (step S27 of FIG. 2 is not executed), and data is not encrypted in the subsequent data reading and data writing process.

Processes corresponding to steps S108, S209, S210 and S111 of FIG. 4 are not performed in the sequence of FIG. 12. In steps S129 and S231, read data and data to be written are transmitted as are without being encrypted. In steps S228 and S130, data of received frames are acquired or stored without being decrypted. The process in steps S129 and S131 are identical to the process in step S32 of FIG. 2.

As shown in FIG. 12, the communication ID generated in step S121 is also embedded as an identifier in a frame transmitted in each of steps S227, S129, S231 and S131.

The IC card 200 of embodiments of the present invention can be used with the generally available reader/writer and provides device compatibility, thereby keeping costs low in communication systems.

In accordance with the preceding embodiments, the random number A generated in the IC card 200 is encrypted using the secret key stored in the IC card 200, and the encrypted random number A is then transmitted as the communication ID to the reader/writer 100. The reader/writer 100 and the IC card 200 mutually identify and perform data encryption communication using the random number A.

The communication ID is stored in the 8 byte field for NFCID 2 in the response frame defined by the NFCIP-1 standard. Each of the communication ID and the random number A is limited to a data length of a maximum of 8 bytes (64 bits).

In 2-Key Triple-DES as an encryption algorithm, a data length of key is 112 bits. To transmit information relating to a key of 112 bits, a data length of at least 112 bits is required. In advanced encryption standard (AES) as an encryption algorithm, the data length of the key is a minimum of 128 bits. To transmit information relating to a key of 128 bits, a data length of at least 128 bits is required.

If 2-Key Triple-DES or AES is adopted as an encryption algorithm, a single response to a polling request cannot transfer all information required to generate a key for encryption communication. It is necessary that the reader/writer 100 transmit to the IC card 200 a frame containing a command enquiring about lack of information, and that the IC card 200 reply in response. In addition to the procedure of FIG. 4, an additional process to exchange remaining information between the reader/writer 100 and the IC card 200 needs to be performed.

Figure 13:
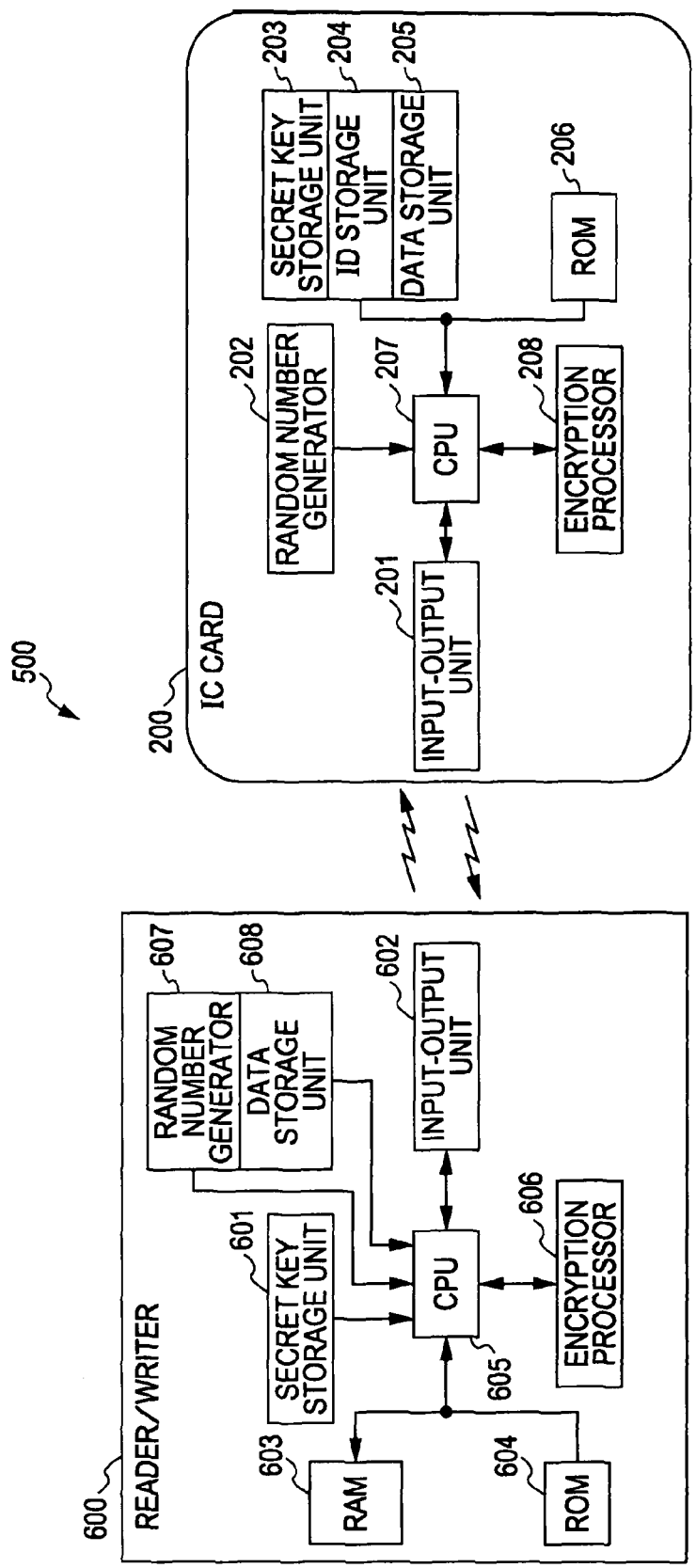
FIG. 13 is a block diagram illustrating a communication system in accordance with another embodiment of the present invention.

In a communication system 500 of FIG. 13, a communication for exchanging remaining information compensating for lack of key information between the reader/writer 100 and the IC card 200 is not required even when the data length of the key used in a predetermined encryption algorithm is 128 bits.

FIG. 13 is a block diagram illustrating the communication system 500 in accordance with one embodiment of the present invention. As shown, elements identical to those described in the preceding embodiment are designated with the same reference numerals and the discussion thereof is omitted as appropriate.

The communication system 500 includes a reader/writer 600 and the IC card 200. In the communication system 500, the same IC card 200 as the one used in the communication system 50 performs wireless communication with the reader/writer 600.

The reader/writer 600 includes a secret key storage unit 601, an input-output unit 602, a RAM 603, a ROM 604, a CPU 605 and an encryption processor 606 respectively identical to the counterparts thereof in the reader/writer 100 of FIG. 1. The reader/writer 600 further includes a random number generator 607 and a data storage unit 608.

As the random number generator 202 in the IC card 200, the random number generator 607 generates a random number of a predetermined digit as necessary. For example, the random number generator 607 generates a random number B of 8 byte long. The data storage unit 608 stores data that needs to be stored in communication with the IC card 200. For example, the data storage unit 608 stores the random number B generated by the random number generator 607.

As the above-described communication system 50, the IC card 200 generates the random number A of 8 bytes in the communication system 500. The IC card 200 transmits to the reader/writer 600 the random number A encrypted with the communication ID. The reader/writer 600 also generates the random number B of 8 byte long, and transmits to the IC card 200 the random number B encrypted with the secret key. As a result, each of the reader/writer 600 and the IC card 200 can share the 16 byte random number including the 8 byte random number originated from own device and the other 8 byte random number received from the communication partner device. Each of the reader/writer 600 and the IC card 200 employs the 16 byte (182 bit) random number as a session key.

As in the communication process of FIG. 4, the reader/writer 600 performs data reading and data writing on the IC card 200. The encrypted random number B is transmitted from the reader/writer 600 to the IC card 200 in the following two methods. In a first method, the encrypted random number B is transmitted as incidental information to a polling request. In a second method, the encrypted random number B is transmitted as incidental information to a frame transmitted subsequent to the polling request. Each of the polling request frame and the frame (containing a command requesting the reading of the card ID) subsequent to the polling request frame contains an empty area storing (expandable to) at least 8 bit long data.

Figure 14:
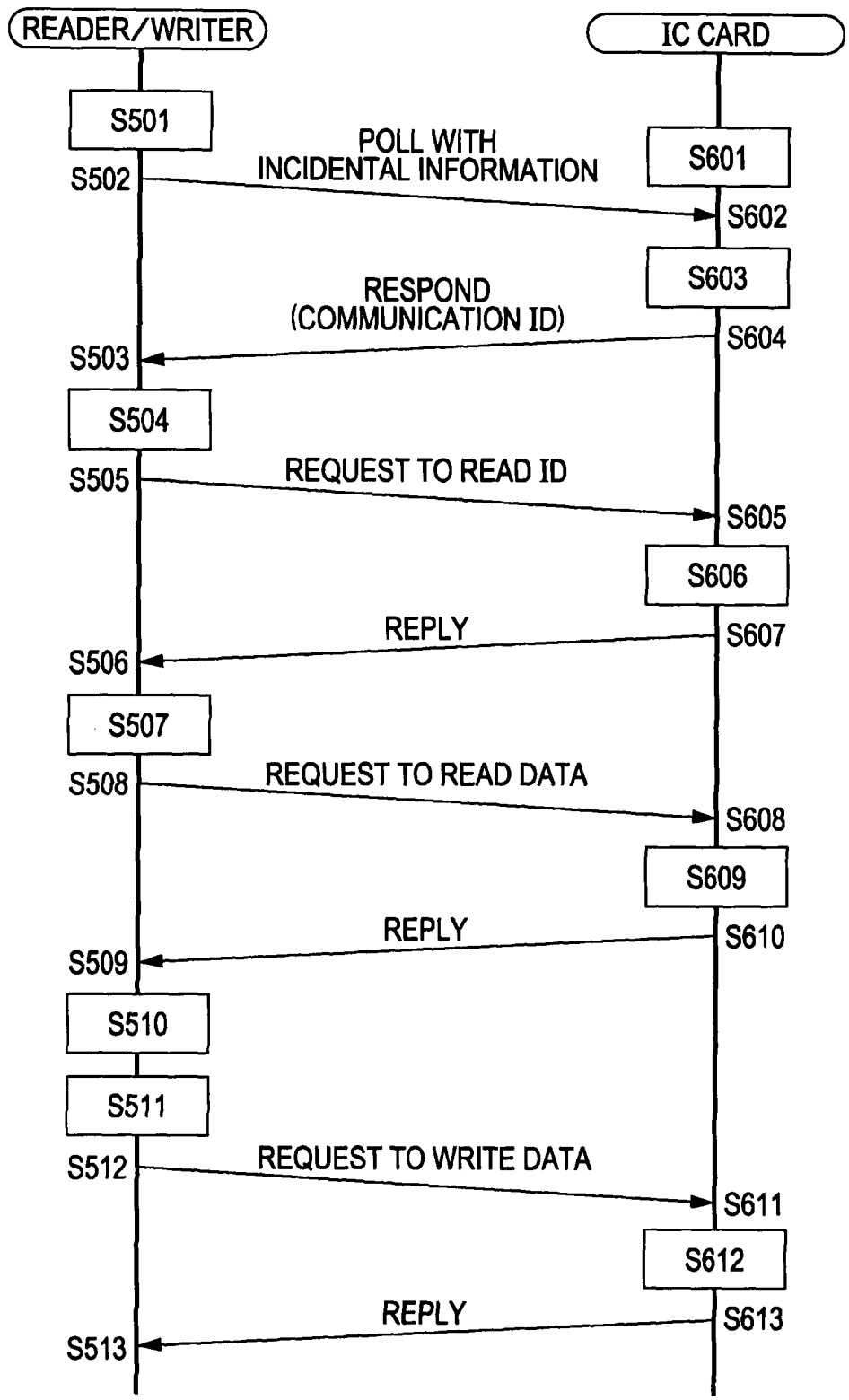
FIG. 14 is a flowchart illustrating in detail communications performed between the reader/writer of FIG. 13 and the IC card.

FIG. 14 is a flowchart of a communication process performed between the reader/writer 600 and the IC card 200. In the communication process, the encrypted random number B is transmitted from the reader/writer 600 to the IC card 200 as the incidental information to the polling request.

The IC card 200 may be placed close to the antenna of the reader/writer 600, and power generated by an AC magnetic field excited in the antenna of the input-output unit 201 may be fed to each section of the IC card 200. The IC card 200 performs step S601, thereby generating a random number A of 8 bytes. Step S601 is identical to the communication ID generation process discussed with reference to FIG. 5 and is not discussed here.

The reader/writer 600 performs step S501, thereby generating a polling frame containing incidental information.

The polling request generation process performed in step S501 of FIG. 14 is described below with reference to a flowchart of FIG. 15.

In step S701, the random number generator 607 generates the random number B of 8 bytes.

In step S702, the CPU 605 stores the random number B generated in step S701 on a predetermined area of the data storage unit 608.

In step S703, the encryption processor 606 encrypts the random number B generated in step S701 using a key stored on the secret key storage unit 601.

In step S704, the CPU 605 stores the data resulting from step S703 (i.e., the encrypted random number B) as the incidental information of the polling request on a predetermined area of the data storage unit 608.

Returning to FIG. 14, the reader/writer 600 transmits in step S502 the polling request containing the incidental information to the IC card 200. In step S602, the IC card 200 receives the polling request.

In step S603, the IC card 200 decrypts the incidental information of the polling request received from the reader/writer 600, thereby acquiring the random number B.

The random number B acquisition process performed in step S603 of FIG. 14 is described below with reference to a flowchart of FIG. 16.

In step S731, the CPU 207 acquires the incidental information (i.e., the encrypted random number B) contained in the polling request received from the reader/writer 600 in step S602.

In step S732, the CPU 207 stores the incidental information acquired in step S731 on a predetermined area of the data storage unit 205.

In step S733, the encryption processor 208 decrypts the encrypted random number B, i.e., the incidental information contained in the polling request acquired in step S731 using the key stored on the secret key storage unit 203. The random number B is thus acquired.

In step S734, the CPU 207 stores the random number B acquired in step S733 on a predetermined area of the data storage unit 205.

Returning to FIG. 14, the IC card 200 transmits in step S604 the response responsive to the polling request received in step S602 to the reader/writer 600. The communication ID generated in step S601 (i.e., the encrypted random number A) is stored as NFCID 2 (see FIG. 3) contained in a predetermined area in the response frame. The reader/writer 600 receives the response frame in step S503.

In step S504, the reader/writer 600 acquires the random number A by decrypting the communication ID of the response frame received from the IC card 200. Step S504 is identical to the random number acquisition process discussed with reference to FIG. 6 and is not discussed here.

The reader/writer 600 and the IC card 200 have now exchanged the session ID (i.e., the communication ID) required in the current communication (session) and the session key (i.e., the 8 byte random number A and the 8 byte random number B).

Subsequent to step S504, the communication ID uniquely identifying each of the reader/writer 600 and the IC card 200 as a communication partner is embedded in each of the frames communicated between the reader/writer 600 and the IC card 200. The frame communicated between the reader/writer 600 and the IC card 200 contains data encrypted with a 16 byte session key including the 8 byte random number A and the 8 byte random number B.

The transmission of the frame containing the request command to read the card ID, the request command to read data, and the request command to write data performed by the reader/writer 600 subsequent to step S504 and the reply by the IC card 200 in response to the frame are respectively identical to the counterparts performed between the reader/writer 100 and the IC card 200 as previously discussed with reference to FIG. 4, and are not discussed herein. More specifically, steps S505 through S513 of FIG. 14 are respectively identical steps S204 through S212 of FIG. 4. Steps S605 through S613 of FIG. 14 are respectively identical to steps S104 through S112 of FIG. 4. The difference between the process of FIG. 4 and the process of FIG. 14 is that the data contained in the frames transmitted between the reader/writer 600 and the IC card 200 is encrypted with a combination of the random number A and the random number B (16 byte session key) rather than with the random number A (8 byte session key).

Figure 17:
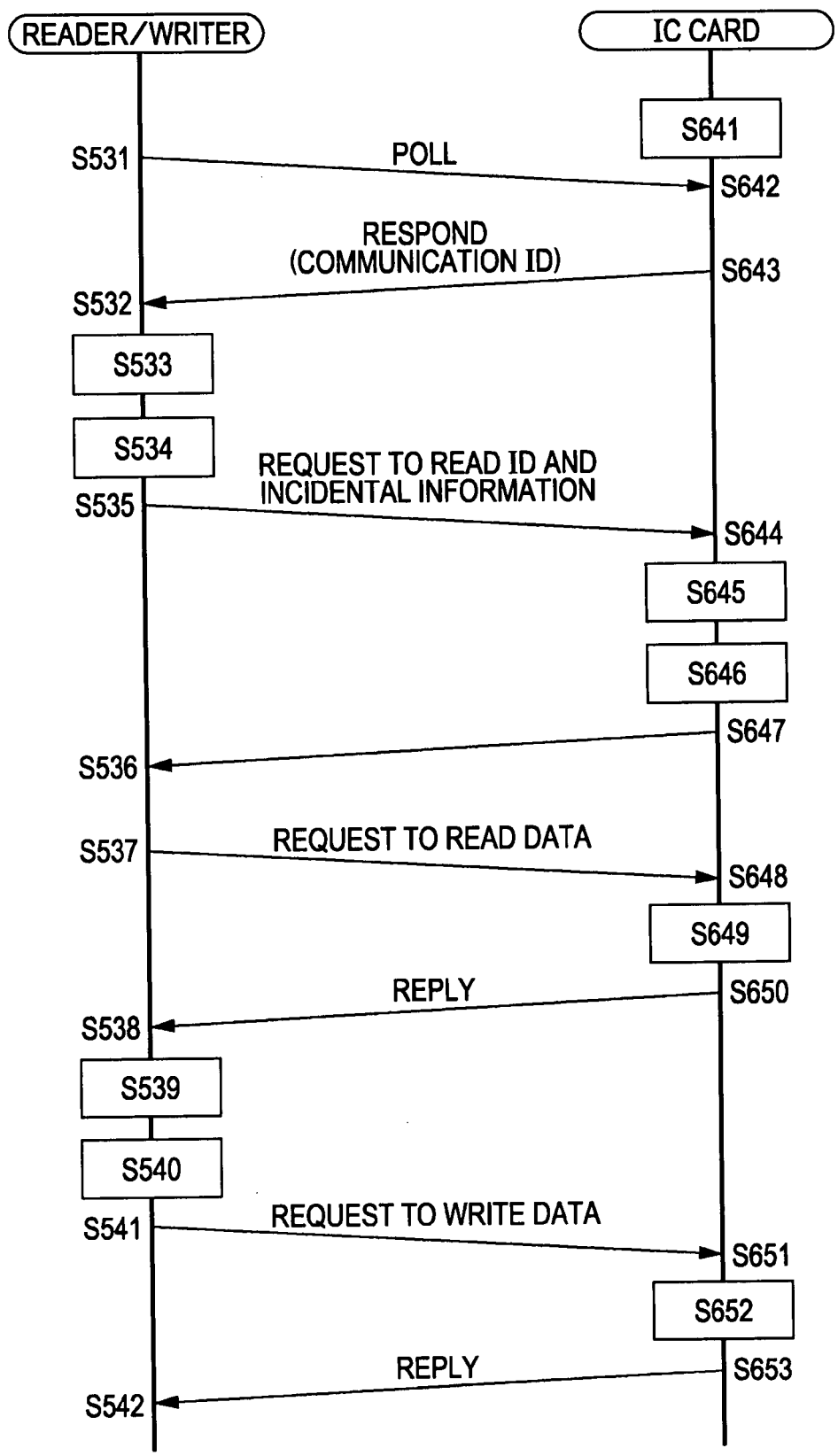
FIG. 17 is a flowchart illustrating in detail communications performed between the reader/writer of FIG. 13 and the IC card.

FIG. 17 is a flowchart of a communication process performed between the reader/writer 600 and the IC card 200. In the communication process, the encrypted random number B is transmitted from the reader/writer 600 to the IC card 200 as the incidental information to the frame transmitted subsequent to the polling request.

As shown in FIG. 17, the IC card 200 generates the 8 byte random number A, and transmits the encrypted random number A as the communication ID to the reader/writer 600 in response to the polling request from the reader/writer 600. The reader/writer 600 receives and decrypts the communication ID, thereby acquiring the 8 byte random number A. The process performed heretofore is identical to the process performed between the reader/writer 100 and the IC card 200 discussed with reference to FIG. 4. More specifically, steps S531 through S533 of FIG. 17 performed by the reader/writer 600 are respectively identical to steps S201 through S203 of FIG. 4. Steps S641 through S643 of FIG. 17 performed by the IC card 200 are respectively identical to steps S101 through S103 of FIG. 4.

As an identifier uniquely identifying each of the reader/writer 600 and the IC card 200 as a communication partner, the communication ID is embedded in each of the frames communicated hereinafter between the reader/writer 600 and the IC card 200.

In step S533, the reader/writer 600 stores the communication ID on a predetermined area of the RAM 103 and decrypts the communication ID to acquire the random number A. In step S534, the reader/writer 600 generates a request to read the card ID with the incidental information attached thereto.

Figure 18:
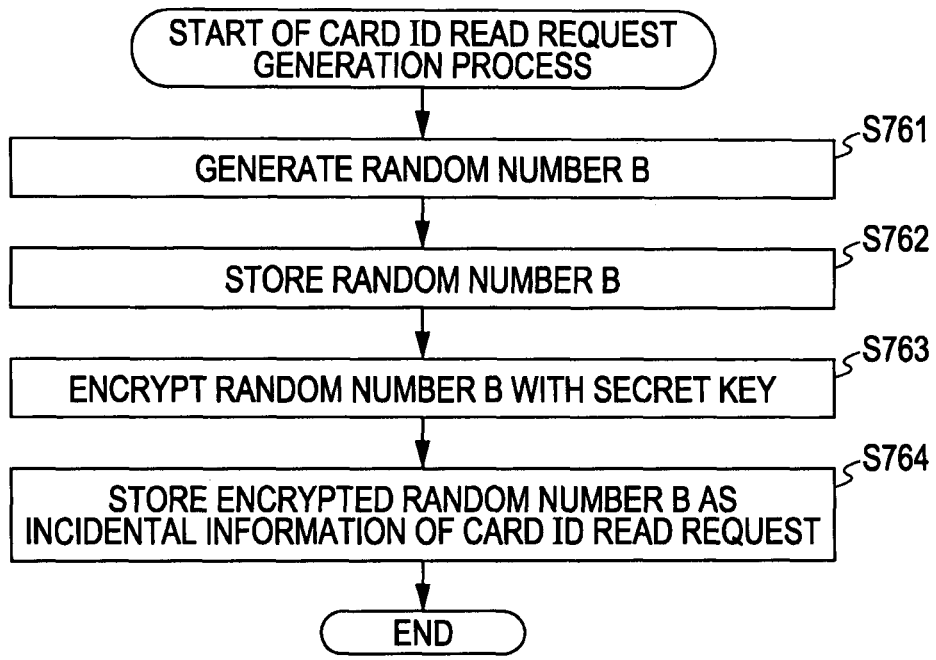
FIG. 18 is a flowchart illustrating a card ID read request generation process.

The card ID read request generation process performed in step S534 of FIG. 17 is described below with reference to a flowchart of FIG. 18.

In step S761, the random number generator 607 generates the random number B.

In step S762, the CPU 605 stores the random number B generated in step S761 on a predetermined area of the data storage unit 608.

In step S763, the encryption processor 606 encrypts the random number B generated in step S761 using a key stored on the secret key storage unit 601.

In step S764, the CPU 605 stores data resulting from step S763 (i.e., encrypted random number B) as the incidental information of the ID read request on a predetermined area of the data storage unit 608.

Returning to FIG. 17, the reader/writer 600 transmits in step S535 to the IC card 200 a frame containing a command requesting the reading of the card ID with the incidental information attached thereto. In step S644, the IC card 200 receives that frame.

In step S645, the IC card 200 decrypts the incidental information of the ID card read request received from the reader/writer 600, thereby acquiring the random number B.

Figure 19:
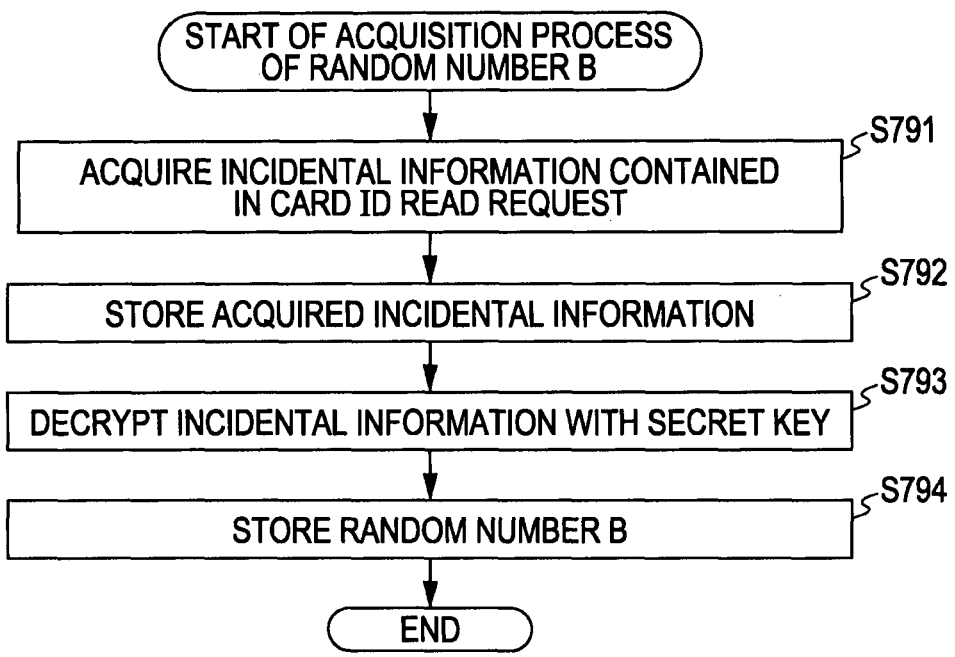
FIG. 19 is a flowchart illustrating a random number B acquisition process.

The random number B acquisition process performed in step S645 of FIG. 17 is described below with reference to a flowchart of FIG. 19.

In step S791, the CPU 207 acquires the incidental information contained in the card ID read request received from the reader/writer 600 in step S644 (i.e., the random number B).

In step S792, the CPU 207 stores the incidental information acquired in step S791 on a predetermined area of the data storage unit 205.

In step S793, the encryption processor 208 decrypts the encrypted random number B, namely, the incidental information contained in the card ID read request acquired in step S791 using a key stored on the secret key storage unit 203. The random number B is thus obtained.

In step S794, the CPU 207 stores the random number B acquired in step S793 on a predetermined area of the data storage unit 205.

Through the above-described process, the reader/writer 600 and the IC card 200 have exchanged the session ID (communication ID) and the session key (the 8 byte random number A and the 8 byte random number B) required to perform the current communication.

Steps S646 through S653 performed by the IC card 200 and steps S536 through S542 performed by the reader/writer 600 shown in FIG. 17 are respectively identical to steps S105 through S112 and steps S205 through S212 of FIG. 4 except that the data contained in the frames communicated between the reader/writer 600 and the IC card 200 is encrypted with a combination of the random number A and the random number B (the 16 byte session key) rather than with the random number A (the 8 byte session key).

In the communication system 500 as described above, the reader/writer 600 encrypts the 8 byte random number B generated by the random number generator 607 with the secret key, and then transmits to the IC card 200 the encrypted random number B in the polling frame as the incidental information or in the next frame subsequent to the polling frame. The IC card 200 encrypts the random number A generated by the random number generator 202 with the secret key and transmits the encrypted random number A as the communication ID to the reader/writer 600.

Each of the reader/writer 600 and the IC card 200 shares the 16 byte (128 bit) long key containing a combination of the 8 byte long random number A (random number B) generated by own device and the 8 byte long random number B (random number A) generated by the communication partner.

The communication system of embodiments of the present invention can work with the encryption algorithm such as 2-Key Triple-DES or AES requiring a key data length of 112 bits or 128 bits. The number of communication frames (number of communication sessions) performed between the reader/writer 600 and the IC card 200 is identical to the number communication frames performed in the communication system 50 as seen from the comparison of the flowchart of FIG. 4 with the flowchart of FIG. 17. More specifically, the communication system 50 needs an additional communication for enquiring about information insufficiency for purposes of sharing the 16 byte long key while the communication system 500 is free from such an additional communication step.

With a minimum number of communication frames, the communication system 500 is compatible with an encryption system that uses a key having a data length longer than the data length of the communication ID.

In the above discussion, the data length of the random number B generated by the reader/writer 600 is 8 bytes long. The data length of the random number B may be set to be longer than 8 bytes depending on an empty area of a frame storing the incidental information. The session key used in each of the reader/writer 600 and the IC card 200 may be set to be longer than 128 bits.

As described above with reference to FIG. 2, the encryption flag is set to ON in the preceding embodiments when the card ID transmission request is issued. To communicate data in the encrypted form thereof, the reader/writer 600 transmits the card ID transmission request to the IC card 200.

The card ID may not be required even though data to be communicated needs to be kept secret. In such a case, a command to set the encryption flag to ON may be separately arranged, and transmitted from the reader/writer 600 to the IC card 200. More specifically, with reference to the processes of FIG. 14 and FIG. 17, a frame containing the command to set the encryption flag to ON instead of the card ID read request command is transmitted from the reader/writer 600 to the IC card 200. To encrypt data all the time, data communicated between the reader/writer 600 and the IC card 200 is always decrypted (with the encryption flag kept to ON) after exchange of the session key. In this case, the encryption flag may be eliminated.

The communication systems including the IC card and the reader/writer have been discussed. The present invention is also applicable to a system including an NFCIP-1 initiator and an NFCIP-1 target such as an RFID and an RFID reader.

The above-described series of process steps may be performed using hardware or software. If the series of process steps is performed using software, a program forming the software is executed by one of the CPU 105 and the CPU 207 of FIG. 1. One of the reader/writer 100 and the IC card 200 reads the program from a readable recording medium.

The above-described series of process steps may be performed in the time-series order described above. Alternatively, the series of process steps may be performed in parallel or separately.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system uniquely identifying a communication partner within a predetermined coverage area and transmitting and receiving information in a predetermined protocol, the communication system comprising a device and an information processing apparatus with one performing wireless communication with the other within the predetermined coverage area, the device including:
random number generating means for generating a random number;
device encryption means for encrypting or decrypting information in accordance with a predetermined algorithm based on a predetermined key;
device secret key storage means for storing a secret key, the secret key being used by the device encryption means for encryption and decryption, and being pre-shared with the information processing apparatus;
communication ID transmitting means for transmitting to the information processing apparatus a response containing a communication ID, the communication ID uniquely identifying the information processing apparatus as a communication partner, and being an ID encrypted from the random number with the secret key by the device encryption means, the random number being generated by the random number generating means in response to a poll transmitted from the information processing apparatus; and
device transmitting and receiving means for transmitting or receiving information to or from the information processing apparatus, the information being encrypted or decrypted by the device encryption means using as a key the random number generated by the random number generating means; and the information processing apparatus including:
apparatus encryption means for encrypting or decrypting information in accordance with an algorithm predetermined based on a predetermined key;
apparatus secret key storage means for storing a secret key, the secret key being used by the apparatus encryption means for encryption or decryption, and being pre-shared with the device;
communication ID storage means for storing the communication ID contained in the response transmitted and then received from the device in response to the poll, the communication ID being as an identifier for uniquely identifying the device as a communication partner;
random number acquisition means for acquiring the random number by decrypting the communication ID with the secret key with the apparatus encryption means; and
apparatus transmitting and receiving means for transmitting or receiving information to or from the device, the information being encrypted or decrypted with the random number as a key acquired by the random number acquisition means with the apparatus encryption means, wherein the communication ID is transmitted to the information processing apparatus before the information processing apparatus transmits the information being encrypted with the random number.

2. A communication method of a communication system uniquely identifying a communication partner within a predetermined coverage area and transmitting and receiving information in a predetermined communication protocol, the communication system including a device and an information processing apparatus with one performing wireless communication with the other within the predetermined coverage area, the method comprising steps of:
generating a random number;
transmitting to the information processing apparatus a response containing a communication ID, the communication ID uniquely identifying the information processing apparatus as a communication partner, and being produced by encrypting in accordance with a predetermined algorithm with a secret key pre-shared with the information processing apparatus a random number generated in response to a poll transmitted from the information processing apparatus;

transmitting or receiving information to or from the information processing apparatus, the information being encrypted or decrypted in accordance with the algorithm with the generated random number as a key;

storing as an identifier the communication ID contained in the response transmitted and then received from the device in response to the poll, the identifier being used to identify uniquely the device as a communication partner;

acquiring the random number by decrypting the communication ID in accordance with a predetermined algorithm using the secret key pre-shared with the device; and transmitting or receiving information to or from the device, the information encrypted or decrypted in accordance with the algorithm using the acquired random number as a key, wherein the communication ID is transmitted to the information processing apparatus before the information processing apparatus transmits the information being encrypted with the random number.

3. A device in a communication system uniquely identifying a communication partner within a predetermined coverage area and transmitting and receiving information in a predetermined protocol, the communication system including the device and an information processing apparatus with one performing wireless communication with the other within the predetermined coverage area, the device comprising:

random number generating means for generating a first random number;

device encryption means for encrypting or decrypting information in accordance with a predetermined algorithm based on a predetermined key;

device secret key storage means for storing a secret key, the secret key being used by the device encryption means for encryption and decryption, and being pre-shared with the information processing apparatus;

communication ID transmitting means for transmitting to the information processing apparatus a response containing a communication ID, the communication ID uniquely identifying the information processing apparatus as a communication partner, and being an ID encrypted from the first random number with the secret key by the device encryption means, the first random number being generated by the random number generating means in response to a poll transmitted from the information processing apparatus; and device transmitting and receiving means for transmitting or receiving information to or from the information processing apparatus, the information being encrypted or decrypted by the device encryption means using as a key the first random number generated by the random number generating means, wherein the communication ID is transmitted to the information processing apparatus before the information processing apparatus transmits the information being encrypted with the random number.

4. The device according to claim 3, wherein the communication protocol of the communication system comprises a near field communication interface and protocol -1 (NFCIP1) standardized as ISO/IEC 18092, and wherein the communication ID transmitting means embeds as the communication ID an NFC identifier in accordance with NFCIP-1, the NFC identifier being used in RF collision avoidance and single device detection.

5. The device according to claim 3, further comprising ID storage means for storing a ID unique to the device, wherein when a request to read the unique ID is received from the information processing apparatus, the device encryption means encrypts the unique ID stored on the ID storage means using as a key the first random number generated by the random number generating means and transmits the encrypted unique ID to the information processing apparatus.

6. The device according to claim 5, further comprising determination means for determining whether the unique ID has been encrypted and then transmitted to the information processing apparatus, wherein when the determination means determines that the unique ID has been encrypted and transmitted to the information processing apparatus, the device transmitting and receiving means encrypts or decrypts information to be communicated with the information processing apparatus.

7. The device according to claim 3, wherein the device transmitting and receiving means controls the device encryption means to encrypt or decrypt information to be communicated with the information processing apparatus using the first random number generated by the random number generating means and a second random number encrypted with the secret key and transmitted from the information processing apparatus during the poll or a next transmission of the poll.

8. A communication method of a device in a communication system uniquely identifying a communication partner within a predetermined coverage area and transmitting and receiving information in a predetermined protocol, the communication system including the device and an information processing apparatus with one performing wireless communication with the other within the predetermined coverage area, the method comprising steps of:

generating a random number;

transmitting to the information processing apparatus a response containing a communication ID, the communication ID uniquely identifying the information processing apparatus as a communication partner, and being produced by encrypting in accordance with a predetermined algorithm with a secret key pre-shared with the information processing apparatus a random number produced in response to a poll transmitted from the information processing apparatus; and transmitting or receiving information, the information being encrypted or decrypted in accordance with the algorithm using the generated random number as a key, wherein the communication ID is transmitted to the information processing apparatus before the information processing apparatus transmits the information being encrypted with the random number.

9. A computer program product comprising a non-transitory computer readable medium including program code thereon, for causing a device to perform a communication method of the device in a communication system uniquely identifying a communication partner within a predetermined coverage area and transmitting and receiving information in a predetermined protocol, the communication system including the device and an information processing apparatus with one performing wireless communication with the other within the predetermined coverage area, the program code being executable to perform operations comprising:

generating a random number;

transmitting to the information processing apparatus a response containing a communication ID, the communication ID uniquely identifying the information processing apparatus as a communication partner, and being produced by encrypting in accordance with a predetermined algorithm with a secret key pre-shared with the information processing apparatus a random number produced in response to a poll transmitted from the information processing apparatus; and transmitting or receiving information, the information being encrypted or decrypted in accordance with the algorithm using the generated random number as a key, wherein the communication ID is transmitted to the information processing apparatus before the information processing apparatus transmits the information being encrypted with the random number.

10. An information processing apparatus in a communication system uniquely identifying a communication partner within a predetermined coverage area and transmitting and receiving information in a predetermined protocol, the communication system including a device and the information processing apparatus with one performing wireless communication with the other within the predetermined coverage area, the information processing apparatus comprising:

apparatus encryption means for encrypting or decrypting information in accordance with a predetermined algorithm based on a predetermined key;

apparatus secret key storage means for storing a secret key, the secret key being used by the apparatus encryption means for encryption or decryption, and being pre-shared with the device;

communication ID storage means for storing a communication ID contained in a response transmitted and then received from the device in response to a poll, the communication ID being as an identifier uniquely identifying the device as a communication partner;

random number acquisition means for acquiring a first random number by decrypting the communication ID with the secret key with the apparatus encryption means; and apparatus transmitting and receiving means for transmitting or receiving information to or from the device, the information being encrypted or decrypted by the apparatus encryption means with the first random number acquired by the random number acquisition means, wherein the communication ID is transmitted to the information processing apparatus before the information processing apparatus transmits the information being encrypted with the random number.

11. The information processing apparatus according to claim 10, wherein the communication protocol of the communication system comprises a near field communication interface and protocol -1 (NFCIP-1) standardized as ISO/IEC 18092, and wherein the communication ID storage means stores, as the communication ID, an NFC identifier being obtained in the response transmitted from the device in response to the poll and being used in RF collision avoidance and single device detection in NFCIP-1.

12. The information processing apparatus according to claim 10, wherein when the unique ID of the device is read, the apparatus transmitting and receiving means encrypts or decrypts information to be communicated with the device.

13. The information processing apparatus according to claim 10, further comprising random number generating means for generating a second random number, wherein the apparatus transmitting and receiving means encrypts the second random number with the secret key and transmits the encrypted second random number to the device during the poll or at a next transmission of the poll, and controls the apparatus encryption means to encrypt or decrypt information to be communicated with the device using the first random number acquired by the random number acquisition means and the second random number.

14. An information processing method of an information processing apparatus in a communication system uniquely identifying a communication partner within a predetermined coverage area and transmitting and receiving information in a predetermined protocol, the communication system including a device and the information processing apparatus with one performing wireless communication with the other within the predetermined coverage area, the information processing method comprising steps of:

storing a communication ID contained in a response transmitted and then received from the device in response to a poll, the communication ID being an identifier uniquely identifying the device as a communication partner;

acquiring a random number by decrypting the communication ID in accordance with an algorithm, the algorithm predetermined using a secret key pre-shared with the device; and transmitting or receiving information to and from the device, the information being encrypted or decrypted in accordance with the algorithm using the acquired random number as a key, wherein the communication ID is transmitted to the information processing apparatus before the information processing apparatus transmits the information being encrypted with the random number.

15. A computer program product comprising a non-transitory computer readable medium including program code thereon, for causing an information processing apparatus to perform a communication processing method of a communication system uniquely identifying a communication partner within a predetermined coverage area and transmitting and receiving information in a predetermined protocol, the communication system including a device and the information processing apparatus with one performing wireless communication with the other within the predetermined coverage area, the program code being executable to perform operations comprising:

storing a communication ID contained in a response transmitted and then received from the device in response to a poll, the communication ID being an identifier uniquely identifying the device as a communication partner;

acquiring a random number by decrypting the communication ID in accordance with an algorithm, the algorithm predetermined using a secret key pre-shared with the device; and transmitting or receiving information to and from the device, the information being encrypted or decrypted in accordance with the algorithm using the acquired random number as a key, wherein the communication ID is transmitted to the information processing apparatus before the information processing apparatus transmits the information being encrypted with the random number.

16. A communication system uniquely identifying a communication partner within a predetermined coverage area and transmitting and receiving information in a predetermined protocol, the communication system comprising a device and an information processing apparatus with one performing wireless communication with the other within the predetermined coverage area, the device including:
device random number generating means for generating a first random number;
device encryption means for encrypting or decrypting information in accordance with a predetermined algorithm based on a predetermined key;
device secret key storage means for storing a secret key, the secret key being used by the device encryption means for encryption and decryption, and being pre-shared with the information processing apparatus;
communication ID transmitting means for transmitting to the information processing apparatus a response containing a communication ID, the communication ID uniquely identifying the information processing apparatus as a communication partner, and being an ID encrypted from the first random number with the secret key by the device encryption means, the first random number being generated by the device random number generating means in response to a poll transmitted from the information processing apparatus; and
device transmitting and receiving means for controlling the device encryption means to encrypt or decrypt information to be communicated with the information processing apparatus using the first random number generated by the random number generating means and a second random number encrypted with the secret key and transmitted from the information processing apparatus during the poll or a next transmission of the poll; and
the information processing apparatus including:
apparatus random number generating means for generating the second random number;
apparatus encryption means for encrypting or decrypting information in accordance with a predetermined algorithm based on a predetermined key;
apparatus secret key storage means for storing a secret key, the secret key being used by the apparatus encryption means for encryption or decryption, and being pre-shared with the device;
communication ID storage means for storing the communication ID contained in the response transmitted and then received from the device in response to the poll, the communication ID being an identifier uniquely identifying the device as a communication partner;
random number acquisition means for acquiring the first random number by decrypting the communication ID with the secret key with the apparatus encryption means; and
apparatus transmitting and receiving means for encrypting the second random number with the secret key and transmitting the encrypted second random number to the device during the poll or a next transmission of the poll, and controlling the device encryption means to encrypt or decrypt information to be communicated with the device using the first random number acquired by the random number acquisition means and the second random number, wherein the communication ID is transmitted to the information processing apparatus before the information processing apparatus transmits the information being encrypted with the random number.

17. A communication method of a communication system uniquely identifying a communication partner within a predetermined coverage area and transmitting and receiving information in a predetermined protocol, the communication system including a device and an information processing apparatus with one performing wireless communication with the other within the predetermined coverage area, the method comprising steps of:

generating a first random number;
transmitting to the information processing apparatus a response containing a communication ID, the communication ID uniquely identifying the information processing apparatus as a communication partner, and being produced by encrypting in accordance with a predetermined algorithm with a secret key pre-shared with the information processing apparatus the first random number generated in response to a poll transmitted from the information processing apparatus;
transmitting or receiving information to or from the information processing apparatus, the information being encrypted or decrypted in accordance with the algorithm using as keys the generated first random number and a second random number encrypted with the secret key and transmitted from the information processing apparatus during the poll or at a next transmission of the poll;
generating a second random number;
storing the communication ID contained in the response transmitted and then received from the device in response to the poll, the communication ID being an identifier uniquely identifying the device as a communication partner;
acquiring the first random number by decrypting the communication ID with the secret key pre-shared with the device in accordance with a predetermined algorithm; and
encrypting the second random number with the secret key and transmitting the encrypted secret key to the device during the poll or a next transmission of the poll, and transmitting or receiving information, the information being encrypted or decrypted in accordance with the algorithm using the acquired first random number and the second random number, wherein the communication ID is transmitted to the information processing apparatus before the information processing apparatus transmits the information being encrypted with the random number.

18. A communication system uniquely identifying a communication partner within a predetermined coverage area and transmitting and receiving information in a predetermined protocol, the communication system comprising a device and an information processing apparatus with one performing wireless communication with the other within the predetermined coverage area, the device including:
a random number generating unit generating a random number;
a device encryption unit encrypting or decrypting information in accordance with a predetermined algorithm based on a predetermined key;
a device secret key storage unit storing a secret key, the secret key being used by the device encryption unit for encryption and decryption, and being pre-shared with the information processing apparatus;
a communication ID transmitting unit transmitting to the information processing apparatus a response containing a communication ID, the communication ID uniquely identifying the information processing apparatus as a communication partner, and being an ID encrypted from the random number with the secret key by the device encryption unit, the random number being generated by the random number generating unit in response to a poll transmitted from the information processing apparatus; and a device transmitting and receiving unit transmitting or receiving information to or from the information processing apparatus, the information being encrypted or decrypted by the device encryption unit using as a key the random number generated by the random number generating unit; and the information processing apparatus including:

an apparatus encryption unit encrypting or decrypting information in accordance with an algorithm predetermined based on a predetermined key;

an apparatus secret key storage unit storing a secret key, the secret key being used by the apparatus encryption unit for encryption or decryption, and being pre-shared with the device;

a communication ID storage unit storing the communication ID contained in the response transmitted and then received from the device in response to the poll, the communication ID being as an identifier for uniquely identifying the device as a communication partner;

a random number acquisition unit acquiring the random number by decrypting the communication ID with the secret key with the apparatus encryption unit; and an apparatus transmitting and receiving unit transmitting or receiving information to or from the device, the information being encrypted or decrypted with the random number as a key acquired by the random number acquisition unit with the apparatus encryption unit, wherein the communication ID is transmitted to the information processing apparatus before the information processing apparatus transmits the information being encrypted with the random number.

19. A device in a communication system uniquely identifying a communication partner within a predetermined coverage area and transmitting and receiving information in a predetermined protocol, the communication system including the device and an information processing apparatus with one performing wireless communication with the other within the predetermined coverage area, the device comprising:

a random number generating unit generating a first random number;

a device encryption unit encrypting or decrypting information in accordance with a predetermined algorithm based on a predetermined key;

a device secret key storage unit storing a secret key, the secret key being used by the device encryption unit for encryption and decryption, and being pre-shared with the information processing apparatus;

a communication ID transmitting unit transmitting to the information processing apparatus a response containing a communication ID, the communication ID uniquely identifying the information processing apparatus as a communication partner, and being an ID encrypted from the first random number with the secret key by the device encryption unit, the first random number being generated by the random number generating unit in response to a poll transmitted from the information processing apparatus; and a device transmitting and receiving unit transmitting or receiving information to or from the information processing apparatus, the information being encrypted or decrypted by the device encryption unit using as a key the first random number generated by the random number generating unit, wherein the communication ID is transmitted to the information processing apparatus before the information processing apparatus transmits the information being encrypted with the random number.

20. An information processing apparatus in a communication system uniquely identifying a communication partner within a predetermined coverage area and transmitting and receiving information in a predetermined protocol, the communication system including a device and the information processing apparatus with one performing wireless communication with the other within the predetermined coverage area, the information processing apparatus comprising:

an apparatus encryption unit encrypting or decrypting information in accordance with a predetermined algorithm based on a predetermined key;

an apparatus secret key storage unit storing a secret key, the secret key being used by the apparatus encryption unit for encryption or decryption, and being pre-shared with the device;

a communication ID storage unit storing a communication ID contained in a response transmitted and then received from the device in response to a poll, the communication ID being as an identifier uniquely identifying the device as a communication partner;

a random number acquisition unit acquiring a first random number by decrypting the communication ID with the secret key with the apparatus encryption unit; and an apparatus transmitting and receiving unit transmitting or receiving information to or from the device, the information being encrypted or decrypted by the apparatus encryption unit with the first random number acquired by the random number acquisition unit, wherein the communication ID is transmitted to the information processing apparatus before the information processing apparatus transmits the information being encrypted with the random number.

21. A communication system uniquely identifying a communication partner within a predetermined coverage area and transmitting and receiving information in a predetermined protocol, the communication system comprising a device and an information processing apparatus with one performing wireless communication with the other within the predetermined coverage area, the device including:

a device random number generating unit generating a first random number;

a device encryption unit encrypting or decrypting information in accordance with a predetermined algorithm based on a predetermined key;

a device secret key storage unit storing a secret key, the secret key being used by the device encryption unit for encryption and decryption, and being pre-shared with the information processing apparatus;

a communication ID transmitting unit transmitting to the information processing apparatus a response containing a communication ID, the communication ID uniquely identifying the information processing apparatus as a communication partner, and being an ID encrypted from the first random number with the secret key by the device encryption unit, the first random number being generated by the device random number generating unit in response to a poll transmitted from the information processing apparatus; and a device transmitting and receiving unit controlling the device encryption unit to encrypt or decrypt information to be communicated with the information processing apparatus using the first random number generated by the random number generating unit and a second random number encrypted with the secret key and transmitted from the information processing apparatus during the poll or a next transmission of the poll; and the information processing apparatus including:

an apparatus random number generating unit generating the second random number;

an apparatus encryption unit encrypting or decrypting information in accordance with a predetermined algorithm based on a predetermined key;

an apparatus secret key storage unit storing a secret key, the secret key being used by the apparatus encryption unit for encryption or decryption, and being pre-shared with the device;

a communication ID storage unit storing the communication ID contained in the response transmitted and then received from the device in response to the poll, the communication ID being an identifier uniquely identifying the device as a communication partner;

a random number acquisition unit acquiring the first random number by decrypting the communication ID with the secret key with the apparatus encryption unit; and an apparatus transmitting and receiving unit encrypting the second random number with the secret key and transmitting the encrypted second random number to the device during the poll or a next transmission of the poll, and controlling the device encryption unit to encrypt or decrypt information to be communicated with the device using the first random number acquired by the random number acquisition unit and the second random number, wherein the communication ID is transmitted to the information processing apparatus before the information processing apparatus transmits the information being encrypted with the random number.

* * * * *